United States Patent [19]
Brown, Jr. et al.

[11] Patent Number: 5,840,349
[45] Date of Patent: Nov. 24, 1998

[54] ROTARY BLOW MOLDING MACHINE

[75] Inventors: John M. Brown, Jr., Westminster, Md.; David N. Fiorani, Jacobus, Pa.; John M. Mathy, Jr., Stewartstown, Pa.; Rolf E. Weingardt, York, Pa.

[73] Assignee: Graham Engineering Corporation, York, Pa.

[21] Appl. No.: 797,936

[22] Filed: Feb. 12, 1997

[51] Int. Cl.⁶ .......................... B29C 49/36; B29C 49/56
[52] U.S. Cl. .................. 425/532; 425/453; 425/540; 425/541
[58] Field of Search .................. 425/540, 541, 425/532, 451, 453

[56] References Cited

U.S. PATENT DOCUMENTS

| | | |
|---|---|---|
| 2,579,399 | 12/1951 | Ruekberg . |
| 2,674,006 | 4/1954 | Bailey et al. ............................ 425/532 |
| 2,750,624 | 6/1956 | Coates et al. . |
| 2,750,625 | 6/1956 | Colombo . |
| 2,784,452 | 3/1957 | Ruekberg et al. . |
| 2,810,934 | 10/1957 | Bailey . |
| 2,936,481 | 5/1960 | Wilkalis et al. . |
| 2,952,034 | 9/1960 | Fortner . |
| 3,005,231 | 10/1961 | Pechthold . |
| 3,081,489 | 3/1963 | Jackson et al. . |
| 3,224,038 | 12/1965 | Budesheim . |
| 3,229,006 | 1/1966 | Nohl . |
| 3,257,687 | 6/1966 | Fogelberg et al. . |
| 3,310,824 | 3/1967 | Beer . |
| 3,310,834 | 3/1967 | Simpson et al. . |
| 3,334,379 | 8/1967 | DiSettembrini . |
| 3,334,380 | 8/1967 | DiSettembrini . |
| 3,337,911 | 8/1967 | DiSettembrini . |
| 3,337,912 | 8/1967 | DiSettembrini . |
| 3,344,471 | 10/1967 | Martelli . |
| 3,345,686 | 10/1967 | DiSettembrini . |
| 3,348,267 | 10/1967 | Nouel . |
| 3,390,430 | 7/1968 | Lynch et al. . |
| 3,408,692 | 11/1968 | Schaich . |
| 3,452,391 | 7/1969 | Langecker . |
| 3,457,591 | 7/1969 | Szajna . |
| 3,473,192 | 10/1969 | Martelli . |
| 3,496,599 | 2/1970 | Brown . |
| 3,496,600 | 2/1970 | Heston ................................... 425/540 |
| 3,523,329 | 8/1970 | Gallay .................................... 425/541 |
| 3,537,134 | 11/1970 | Raper et al. . |
| 3,585,682 | 6/1971 | Martelli ................................. 425/532 |
| 3,608,015 | 9/1971 | Martelli ................................. 264/134 |
| 3,608,135 | 9/1971 | Schurman .............................. 425/196 |
| 3,640,661 | 2/1972 | Gasior et al. .......................... 425/395 |
| 3,661,488 | 5/1972 | Latreille ................................ 425/196 |
| 3,752,629 | 8/1973 | Gordon .................................. 425/806 |
| 3,764,250 | 10/1973 | Waterloo ............................... 425/384 |
| 3,767,747 | 10/1973 | Uhlig . |
| 3,785,761 | 1/1974 | Logomasini et al. ................. 426/451 |
| 3,797,985 | 3/1974 | Garver ................................... 425/806 |
| 3,843,305 | 10/1974 | Doughty et al. ....................... 426/465 |
| 3,969,059 | 7/1976 | Michel . |

(List continued on next page.)

FOREIGN PATENT DOCUMENTS

| | | |
|---|---|---|
| 752761 | 2/1967 | Canada ................................. 425/540 |
| 0284242 A2 | 9/1988 | European Pat. Off. . |
| 2.182.761 | 12/1973 | France . |
| 2028326 | 12/1971 | Germany . |
| 1260296 | 4/1996 | Italy . |

*Primary Examiner*—Robert Davis
*Attorney, Agent, or Firm*—Thomas Hooker, P.C.

[57] ABSTRACT

A rotary blow molding machine includes a horizontal main shaft with a plurality of molds spaced around the shaft and mounted on the shaft by linear bearings for movement along the shaft. A shaft drive rotates the shaft and molds around the axis of the shaft in the steps and dwells the shaft and molds between steps. Open molds are rotated from a lower container eject position up to a parison capture position and then close on a parison. The closed molds are shifted axially along the main shaft and the parison is blown. Further rotation of the shaft returns the molds to the mold eject position where the molds open and molded containers are ejected downwardly with gravity assist.

64 Claims, 16 Drawing Sheets

U.S. PATENT DOCUMENTS

| | | | |
|---|---|---|---|
| 3,986,807 | 10/1976 | Takegami et al. | 425/307 |
| 4,007,244 | 2/1977 | Avery et al. | 264/40.7 |
| 4,092,389 | 5/1978 | Sakurai | 425/535 |
| 4,092,392 | 5/1978 | Dunbeker | 425/525 |
| 4,213,750 | 7/1980 | Kubota et al. | 425/531 |
| 4,248,583 | 2/1981 | Hedke et al. | 425/541 |
| 4,391,578 | 7/1983 | Schaar | 425/525 |
| 4,439,127 | 3/1984 | Frohn | 425/532 |
| 4,518,558 | 5/1985 | Anway et al. | 264/515 |
| 4,523,904 | 6/1985 | Martin | 425/539 |
| 4,549,865 | 10/1985 | Myers | 425/526 |
| 4,565,516 | 1/1986 | Szajna et al. | 425/540 |
| 4,589,838 | 5/1986 | Ziegler | 425/540 |
| 4,626,190 | 12/1986 | Hellmer | 425/539 |
| 4,648,824 | 3/1987 | Aoki | 425/150 |
| 4,648,831 | 3/1987 | Johnson | 425/540 |
| 4,650,412 | 3/1987 | Windstrup et al. | 425/182 |
| 4,650,628 | 3/1987 | Evely | 264/531 |
| 4,696,636 | 9/1987 | Evely | 425/526 |
| 4,698,012 | 10/1987 | Shelby et al. | 425/526 |
| 4,717,522 | 1/1988 | Evely | 264/520 |
| 4,726,756 | 2/1988 | Aoki | 425/526 |
| 4,731,011 | 3/1988 | Nakamura et al. | 425/529 |
| 4,741,688 | 5/1988 | Aoki | 425/526 |
| 4,747,769 | 5/1988 | Nakamura et al. | 425/529 |
| 4,752,206 | 6/1988 | Nowicki et al. | 425/537 |
| 4,762,486 | 8/1988 | Windstrup et al. | 425/541 |
| 4,786,245 | 11/1988 | Windstrup et al. | 425/541 |
| 4,790,741 | 12/1988 | Takakusaki et al. | 425/526 |
| 4,807,353 | 2/1989 | Corson et al. | 29/568 |
| 4,822,275 | 4/1989 | Voss et al. | 425/539 |
| 4,834,641 | 5/1989 | Keyser | 425/503 |
| 4,834,642 | 5/1989 | Voss et al. | 425/529 |
| 4,861,542 | 8/1989 | Oles et al. | 264/542 |
| 4,878,828 | 11/1989 | Wollshlager et al. | 425/541 |
| 4,902,217 | 2/1990 | Martin et al. | 425/537 |
| 4,919,607 | 4/1990 | Martin et al. | 425/531 |
| 4,929,450 | 5/1990 | Taskakusaki et al. | 425/526 |
| 4,941,816 | 7/1990 | Aoki et al. | 425/533 |
| 4,947,979 | 8/1990 | Martin et al. | 198/343.1 |
| 4,952,134 | 8/1990 | Bartley et al. | 425/525 |
| 4,954,310 | 9/1990 | Andersen | 264/520 |
| 4,959,191 | 9/1990 | Yoshioka et al. | 264/529 |
| 4,968,242 | 11/1990 | Andersen | 425/531 |
| 4,998,873 | 3/1991 | Martin et al. | 425/541 |
| 5,026,267 | 6/1991 | Miyabe | 425/451.9 |
| 5,039,298 | 8/1991 | Takakusaki et al. | 425/504 |
| 5,045,255 | 9/1991 | Kurz | 264/51 |
| 5,049,061 | 9/1991 | Billoud | 425/522 |
| 5,064,366 | 11/1991 | Voss | 425/541 |
| 5,080,574 | 1/1992 | Koga et al. | 425/526 |
| 5,112,561 | 5/1992 | Dickinson | 264/531 |
| 5,118,460 | 6/1992 | Rydmann | 264/509 |
| 5,188,850 | 2/1993 | Hirata et al. | 425/589 |
| 5,206,038 | 4/1993 | Yonezawa | 425/450.1 |
| 5,225,216 | 7/1993 | Barracchini et al. | 425/451.5 |
| 5,229,143 | 7/1993 | Ogura et al. | 425/532 |
| 5,238,390 | 8/1993 | Dickinson | 425/529 |
| 5,240,718 | 8/1993 | Young et al. | 425/539 |
| 5,244,610 | 9/1993 | Kitzmiller | 264/40.1 |
| 5,256,056 | 10/1993 | Brown et al. | 425/595 |
| 5,332,384 | 7/1994 | Abramat | 425/522 |
| 5,346,386 | 9/1994 | Albrecht et al. | 425/541 |
| 5,346,665 | 9/1994 | Watanabe et al. | 264/516 |
| 5,388,981 | 2/1995 | Scharrenbroich | 425/541 |
| 5,407,342 | 4/1995 | Boucher et al. | 425/145 |
| 5,417,913 | 5/1995 | Arend | 264/328.1 |
| 5,454,709 | 10/1995 | Leonhartsberger et al. | 425/589 |
| 5,458,479 | 10/1995 | Minghetti | 425/503 |
| 5,478,229 | 12/1995 | Kato et al. | 425/529 |
| 5,486,103 | 1/1996 | Meiring et al. | 425/541 |
| 5,494,435 | 2/1996 | Vandenberg | 425/589 |
| 5,551,862 | 9/1996 | Allred, Jr. | 425/532 |
| 5,556,648 | 9/1996 | Budzynski et al. | 425/150 |
| 5,618,487 | 4/1997 | Hettinga | 264/328.1 |
| 5,665,404 | 9/1997 | Weber et al. | 425/540 |
| 5,698,241 | 12/1997 | Kitzmiller | 425/532 |
| 5,759,593 | 6/1998 | Weber et al. | 425/540 |

ROTARY BLOW MOLDING MACHINE

FIELD OF THE INVENTION

The invention relates to rotary blow molding machines and particularly to a rotary blow molding machine in which molds are indexed in steps around a horizontal axis, and related methods.

DESCRIPTION OF THE PRIOR ART

Blow molded plastic containers are conventionally manufactured in high volumes using a continuously rotating horizontal rotary blow machine having a large number of molds mounted around the circumference of the machine. A continuously extruded parison is guided between open mold halves. With rotation, the molds close on the parison, the parison is blown, the molds open to eject containers and the cycle is repeated. The molds are continuously rotated at high speed to produce containers in high volumes. These machines are expensive to construct and operate. Change over to a different style container is expensive and time consuming due to the need to build and install a set of new molds. As many as 24 new molds may be required.

Blow molded plastic containers are conventionally manufactured in low volume using shuttle-type blow molding machines in which one or two molds are shifted back and forth between a parison extruder and a molding station. Each open mold is moved under the extruder and to either side of a downwardly growing parison. The mold is dwelled and closed on the parison, the parison is severed and then the mold is moved back to the molding station. The parison is blown at the molding station, the mold opens and the completed container is ejected. While shuttle-type blow molding machines may use multi-cavity molds to increase production, the production of these machines is limited and is considerably less than the production of continuously rotating horizontal rotary blow molding machines.

Intermediate production requirements for containers may be met by using a number of shuttle-type blow molding machines. This approach, however, is expensive in equipment cost and operation and maintenance cost.

U.S. Pat. No. 4,919,607 discloses a prior step-type rotary blow molding machine for producing containers at intermediate production rates.

SUMMARY OF THE INVENTION

The invention is an improved horizontal step-type rotary blow molding machine having a production capacity greater than shuttle-type blow molding machines but less than continuously rotating multi-mold rotary blow molding machines. The machine includes four multi-cavity molds mounted 90° apart around a horizontal main shaft and shiftable axially along the shaft. The shaft and molds are indexed around the shaft in 90° steps and then dwelled for a period of time. During the dwell period the mold located in a retracted position at the bottom of the machine is shifted along the shaft to an ejection position, opened and molded articles are ejected downwardly from the machine, with gravity assist. After ejection, the next 90° indexing of the shaft rotates the open mold in the ejection position up to a parison capture position on the side of the machine where the mold is below a multi-parison extrusion head and surrounds downward growing parisons. During the next dwell period the mold closes, captures the parisons, the extruder bobs up to break the captured parisons away from the continuing growing parisons and the mold is shifted along the axis of the wheel back to a retracted position. Blow pins are then extended axially into the closed mold to calibrate the neck plastic accurately and the parisons are blown. During the next three 90° rotations of the shaft, the closed mold is retained in the retracted axial position with seated blow pins as the parisons cool to form blown containers and is rotated back to the bottom retracted position to complete one cycle of operation.

Each four cavity mold rotates 360° in 10 seconds so that the machine produces containers at the rate of 96 containers per minute. This rate is greater than the rate of production of two mold shuttle-type blow molding machines using the same size molds, but considerably less than the production of continuously rotating horizontal rotary blow molding machines.

The disclosed blow molding machine has the additional advantage that the molds captured downwardly growing parisons and then shift away from the extrusion head and rotate up and around the main shaft so that the blown containers are ejected at the bottom of the machine and are extracted from the molds in a downward direction, with gravity assist. Opening of the molds at the bottom of the machine for removal of the blown containers assures that any flash or possibly deformed containers fall down away from the molds and out of the machine.

The four station rotary blow molding machine is an efficient design with relatively low manufacture and maintenance cost, compared to shuttle-type blow molding machines. Continuously rotated horizontal blow molding machines are considerably more expensive.

Other objects and features of the invention will become apparent as the description proceeds, especially when taken in conjunction with the accompanying drawings illustrating the invention, of which there are eleven sheets.

DESCRIPTION OF THE PREFERRED EMBODIMENT

Figure 1:
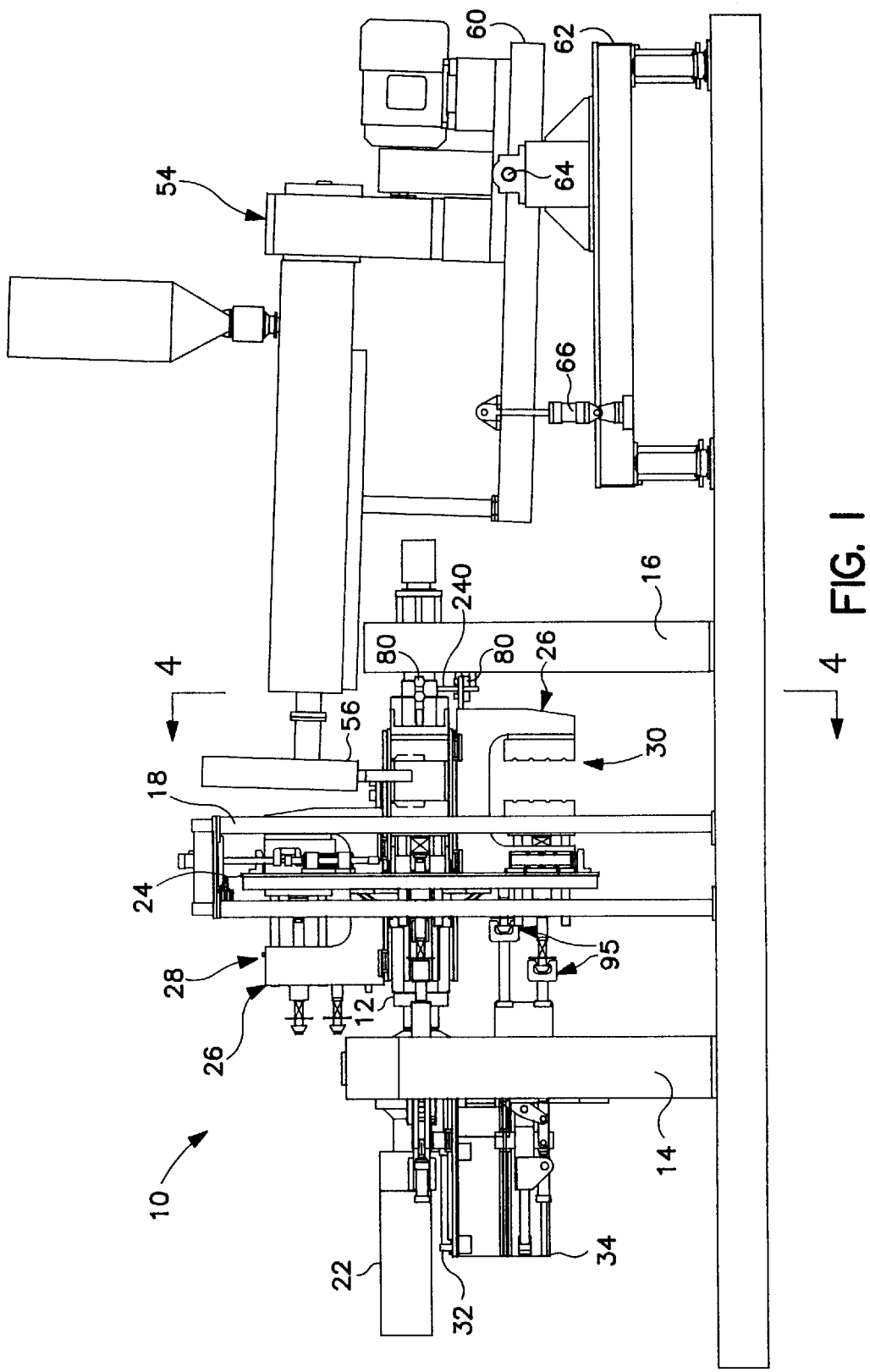
FIG. 1 is a side view of the blow molding machine.
Figure 2:
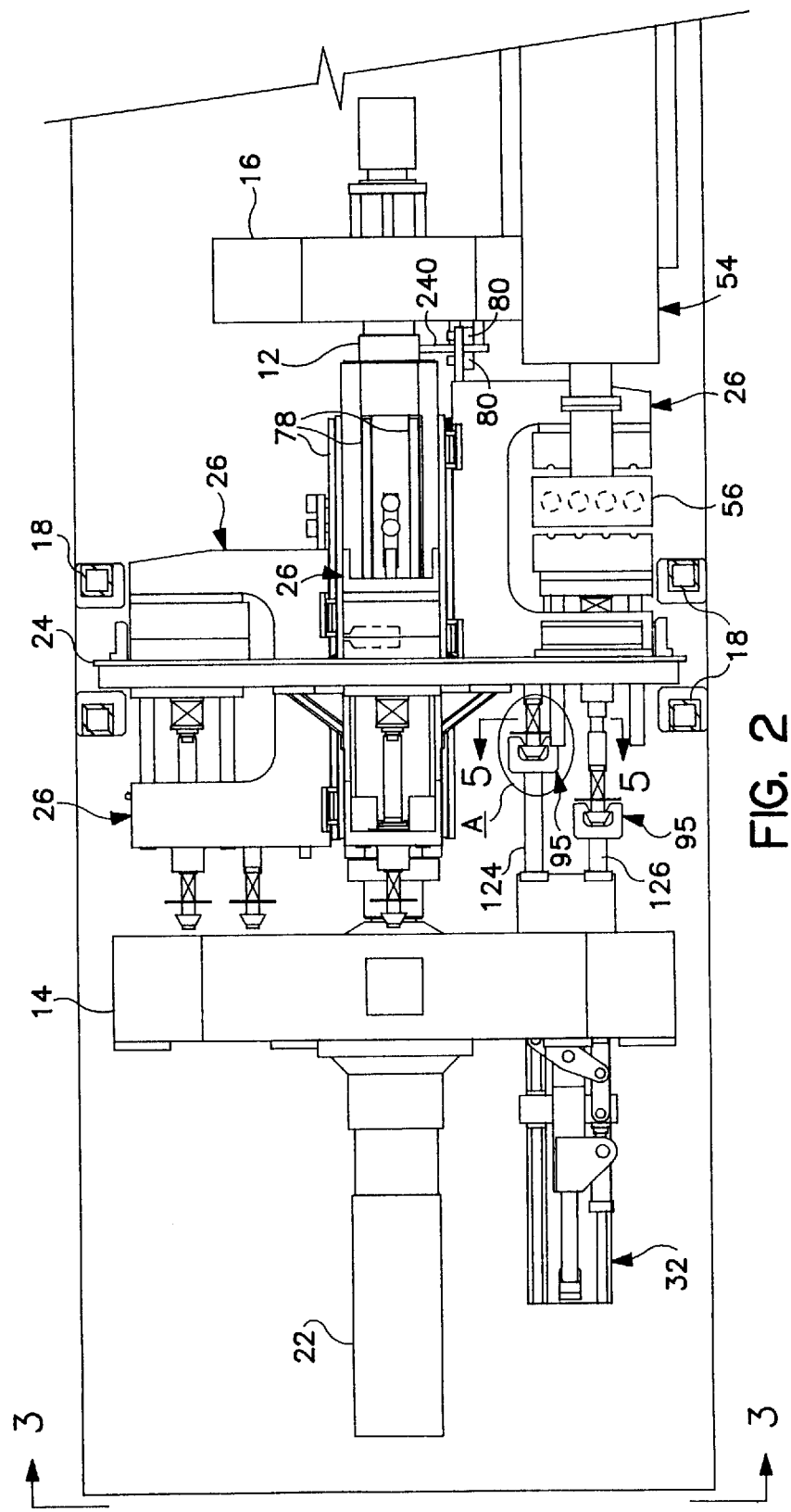
FIG. 2 is a top view of the machine, partially broken away.

Horizontal rotary blow molding machine 10 includes an elongate, four sided main shaft 12 journaled in bearings mounted on spaced apart supports 14 and 16 for rotation about its longitudinal axis. Three sided support 18, shown in FIGS. 1 and 3, surrounds shaft 12 between supports 14 and 16. The shaft 12 is periodically rotated 90° in the direction of arrow 20 and then dwelled by shaft drive 22. A circular support plate 24 is mounted on main shaft 12 between supports 14 and 16 and lies in a plane perpendicular to the axis of the shaft. As illustrated in FIG. 1, the top of support 18 is above plate 24.

Figure 3:
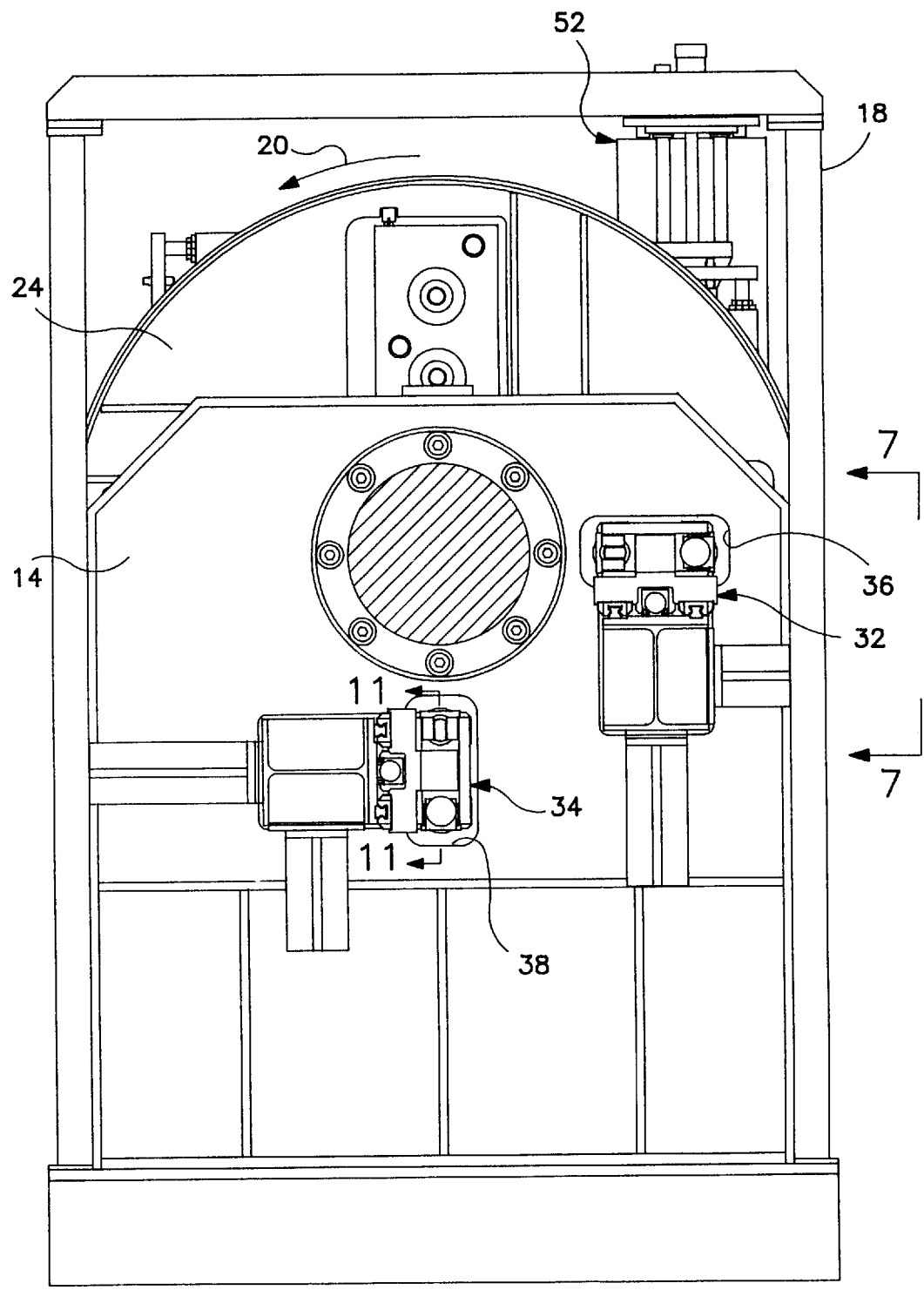
FIG. 3 is an end view of the machine taken generally along line 3—3 of FIG. 2.

Machine 10 includes four like mold assemblies 26 each mounted on one side of main shaft 12 by a linear bearing connection and moveable axially along the shaft between a retracted position 28 adjacent support 14 and an extended position 30 adjacent support 16. The mold assemblies are shifted back and forth along the main shaft between retracted and extended axial positions by a drive mechanism including a pair of mold assembly drives 32 and 34. The assembly drives are mounted on the side of support 14 away from plate 24 and extend through openings 36 and 38, respectively, in the support, as illustrated in FIG. 3.

Figure 4:
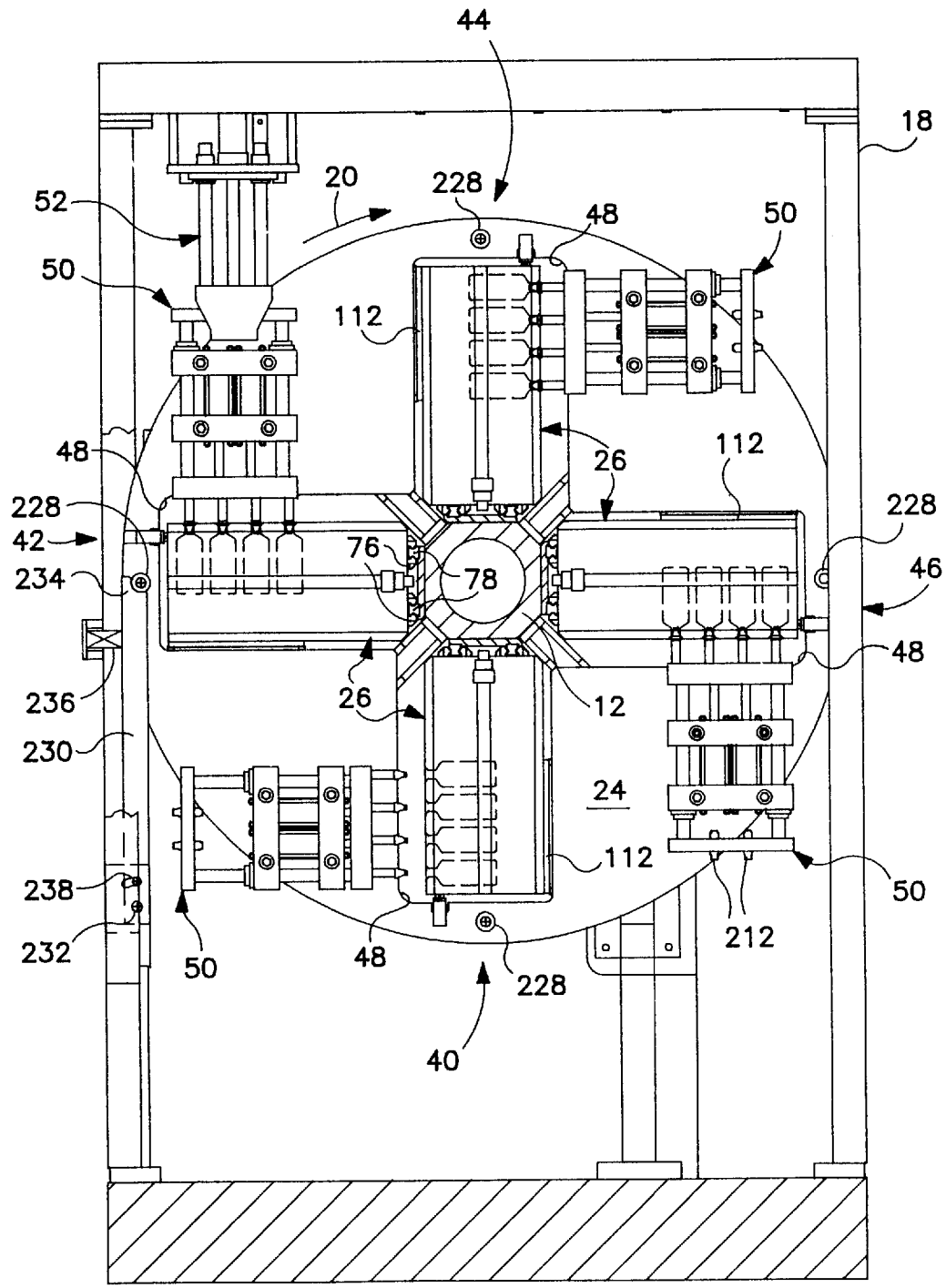
FIG. 4 is a sectional view taken along line 4—4 of FIG. 1 with parts removed.
Figure 5:
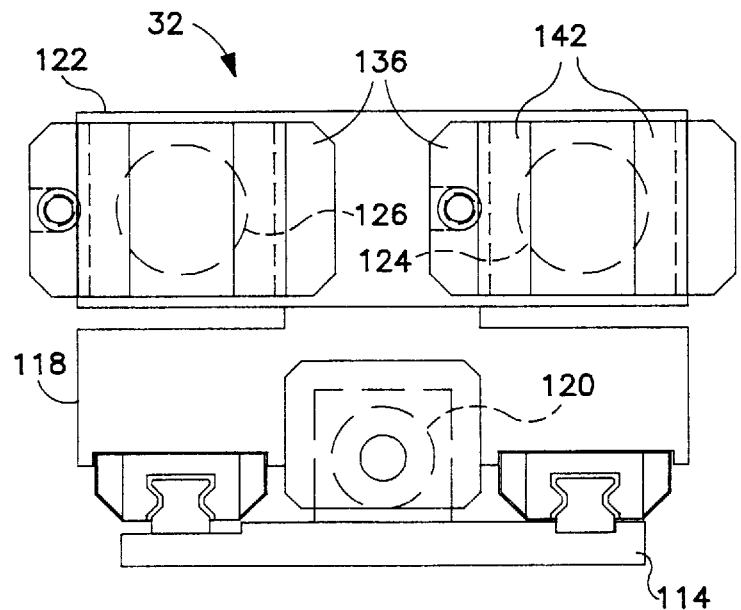
FIG. 5 is an end view of a mold assembly drive.

Drive 22 rotates the mold assemblies in 90° arcuate steps from extended bottom ejection position 40 up to side position 42 where the parisons are captured and, after axial shift, blown up to top cooling position 44, down to cooling side position 46, across from position 44, and down to the retracted bottom position 40. Positions 40-44 are illustrated in FIG. 4. After rotation of the shaft through a 90° step, drive 22 dwells so that the mold assemblies are located at their respective positions for an interval of time prior to rotation or indexing to the next position. Rotation of the mold assemblies to circumferential positions 40 and 42 moves the assemblies into engagement with mold assembly drives 32 and 34 to permit axial shifting of the assemblies along the main shaft while dwelled at the positions. Four cutout openings 48 are provided in plate 24 to permit movement of the mold assemblies 26 along the main shaft.

Four like blow pin assemblies 50 are mounted on plate 24 adjacent the leading side of each opening 48. A blow pin seating drive 52 is mounted on the top of frame 18 above and is engageable with the assembly 50 associated with the mold assembly in circumferential side position 42.

Blow molding machine 10 includes a parison extruder 54 having a four parison extrusion head 56 located above the mold assembly located in side circumferential position 42 and in extended axial position 30. Head 56 extrudes four spaced parisons 58 downwardly toward and into the mold assembly. The extruder is supported on a subframe 60 which is pivotally mounted on base 62 at hinge connection 64. Hydraulic cylinder 66 is connected between the base and subframe such that retraction and extension of the cylinder lowers and raises head 56 with respect to the mold assembly. The bobbing movement of the head facilitates positioning of the parisons in the mold assembly and breaking of the parisons from the portions captured in the closed mold.

Each mold assembly 26 includes a U-shaped mold carriage 68 having a base 70 and a pair of spaced arms 72 and 74 extending outwardly from the base. Linear bearing members 76 are mounted on the base 70 and engage an elongate bearing member 78 mounted on one side of the main shaft 12 to permit axial movement of the assembly along the shaft. Spaced apart orienting rollers 80 are secured to the end of the base adjacent support 16.

Each mold assembly 26 includes a four cavity blow mold having a first mold half 82 mounted on the inner surface of arm 72 and a second mold half 84 mounted on plate 86. Guide rods 88 on plate 86 extend through bearings on arm 74 to permit movement of mold half 84 toward and away from mold half 82. Each mold half includes four mold recesses 90 which define mold cavities when the molds are closed. Assembly shift rod 92 extends outwardly from arm 74. Mold half shift rod 94 is journaled in a slide bearing in arm 74 and includes an inner end which is connected to plate 86 through a spring stack of Belleville spring washers 96. A mold latch assembly 98 is mounted on the inner face of arm 74 and engages one end of undercut 100 in rod 94 to hold the mold halves closed.

Figure 13:
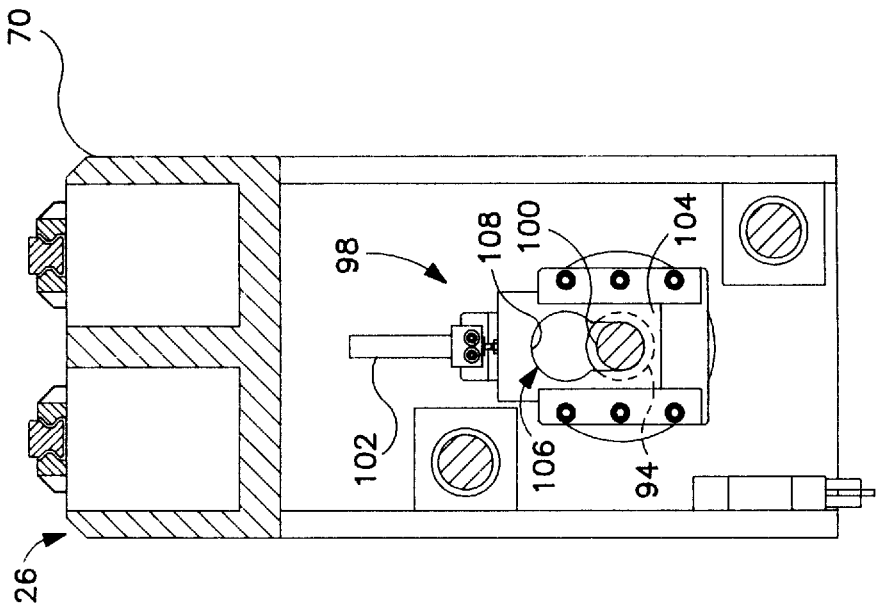
FIG. 13 is similar to FIG. 12, but illustrating a different position.
Figure 12:
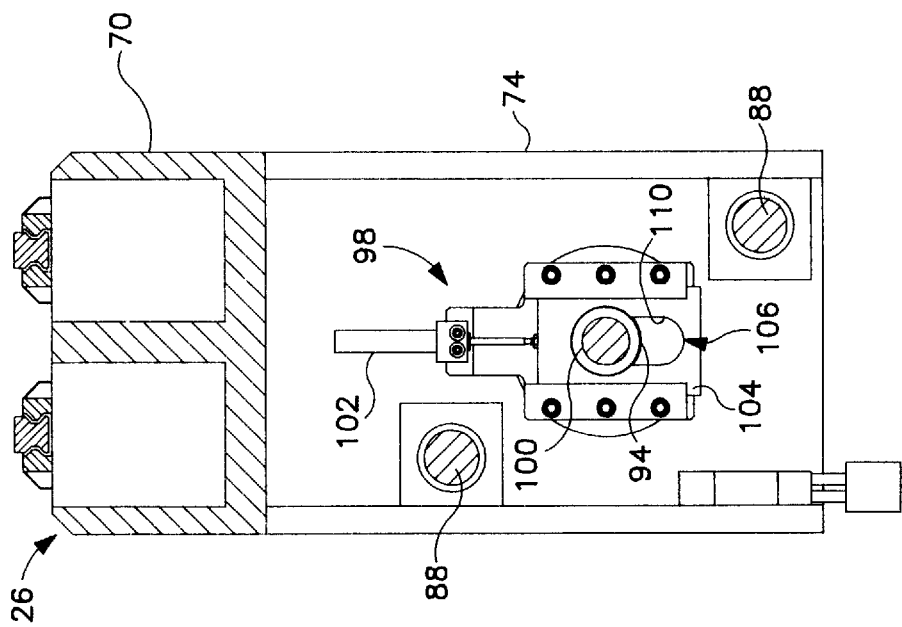
FIG. 12 is a sectional view taken generally along line 12—12 of FIG. 8.

The latch assembly is more fully illustrated in FIGS. 12 and 13. Assembly 98 includes an air cylinder 102 mounted on arm 74. The cylinder has a piston rod which is connected to slidable latch plate 104. The plate is slidably mounted on the arm and moveable between an extended position shown in FIG. 12 and a retracted position shown in FIG. 13. Keyhole aperture 106 is formed in plate 104. The aperture surrounds shift rod 94 and includes an enlarged circular portion 108 adjacent cylinder 102 and a narrow slot portion 110 away from cylinder 102. Portion 108 is slightly larger than the outer diameter of rod 94. Portion 110 has a width slightly greater than the diameter of rod 94 at undercut 100.

With cylinder 102 and plate 104 extended portion 108 surrounds rod 94 and permits free axial movement of the rod past the latch assembly. Retraction of cylinder 102 when the undercut 100 is located in aperture 106 shifts the plate to the position of FIG. 13 where the undercut portion of the rod is fitted in narrow portion 110 and the rod is latched by engagement with the plate to prevent longitudinal movement.

Each mold is closed by mold assembly drive 32. Once closed, the latch assembly 98 shifts to latch the mold in the closed position and hold the mold closed during rotation of the mold from side circumferential position 42 through positions 44 and 46 to bottom circumferential position 40 where the assembly is unlatched and the mold is opened by mold assembly drive 34. Operation of the latch assembly and latching and unlatching of the molds are described in further detail below.

Figure 6:
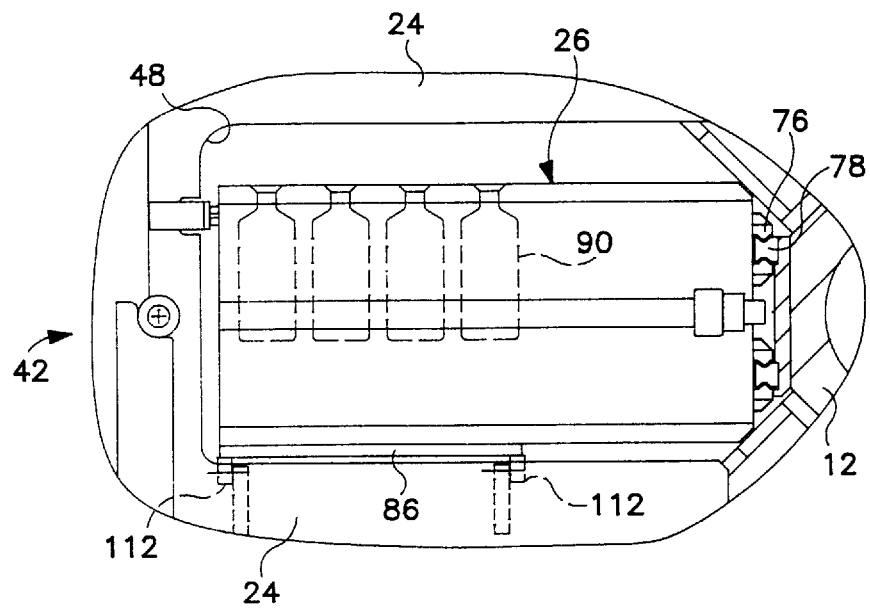
FIG. 6 is an enlarged view of a portion of FIG. 4.

As shown in FIG. 6, a pair of mold support rollers 112 are mounted on plate 24 at the trailing side of each cutout opening 48, across from the blow pin assembly 50 associated with the mold assembly in the opening. The mold assembly at circumferential position 42 rests on rollers 112 during extension of the blow pins into the closed mold. Rollers 112 hold the mold assembly against downward movement during extension of the blow pins.

Mold assembly drive 32 is located to one side of side circumferential position 42. Drive 32 includes a mounting plate 114 on support 14, a mold open and close drive 116 including a pair of carriages 118 slidably mounted on plate 114 for longitudinal movement back and forth along the plate and a mold shift drive 120. Drive 120 comprises a hydraulic cylinder mounted on the end of the plate furthest away from support 14 and having a piston rod joined to the carriage 118 adjacent the support. Extension and retraction of cylinder 120 moves the mold drive 116 back and forth to shift the attached mold assembly at circumferential position 42 between extended axial position 30 and retracted axial position 28.

Figure 8:
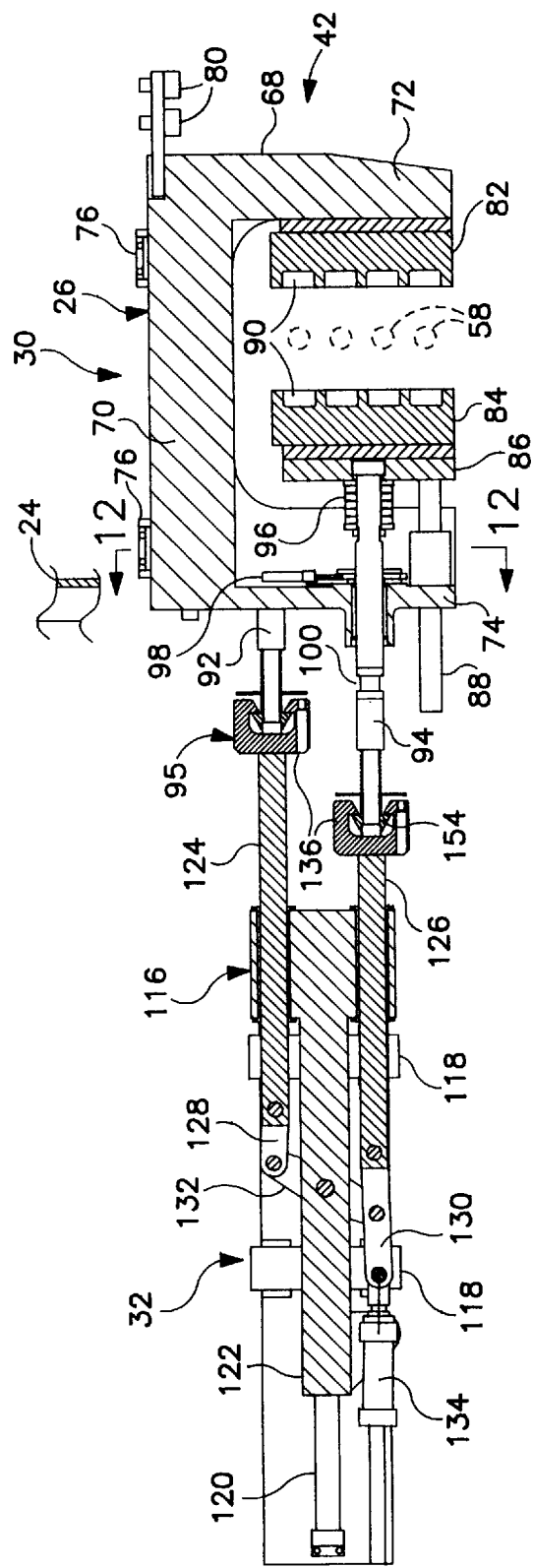
FIG. 8 is a sectional view taken along line 8—8 of FIG. 7.

As illustrated in FIG. 8, drive 116 includes a body 122 mounted on carriages 118. A pair of parallel shift shafts 124 and 126 extend parallel to the axis of the main shaft through bearings at the forward end of body 122. Links 128 and 130 are mounted on the inner ends of shafts 124 and 126 and are pivotally connected to the ends of a pivotal toggle link 132 mounted on body 122. Link 130 extends rearwardly past the toggle link and is connected to the piston rod of hydraulic cylinder 134, also mounted on body 122. Extension of cylinder 134 extends shaft 126 outwardly from body 122 and retracts shaft 124 into body 122 and retraction of cylinder 134 from the extended position retracts 126 while extending shaft 124.

Figure 17:
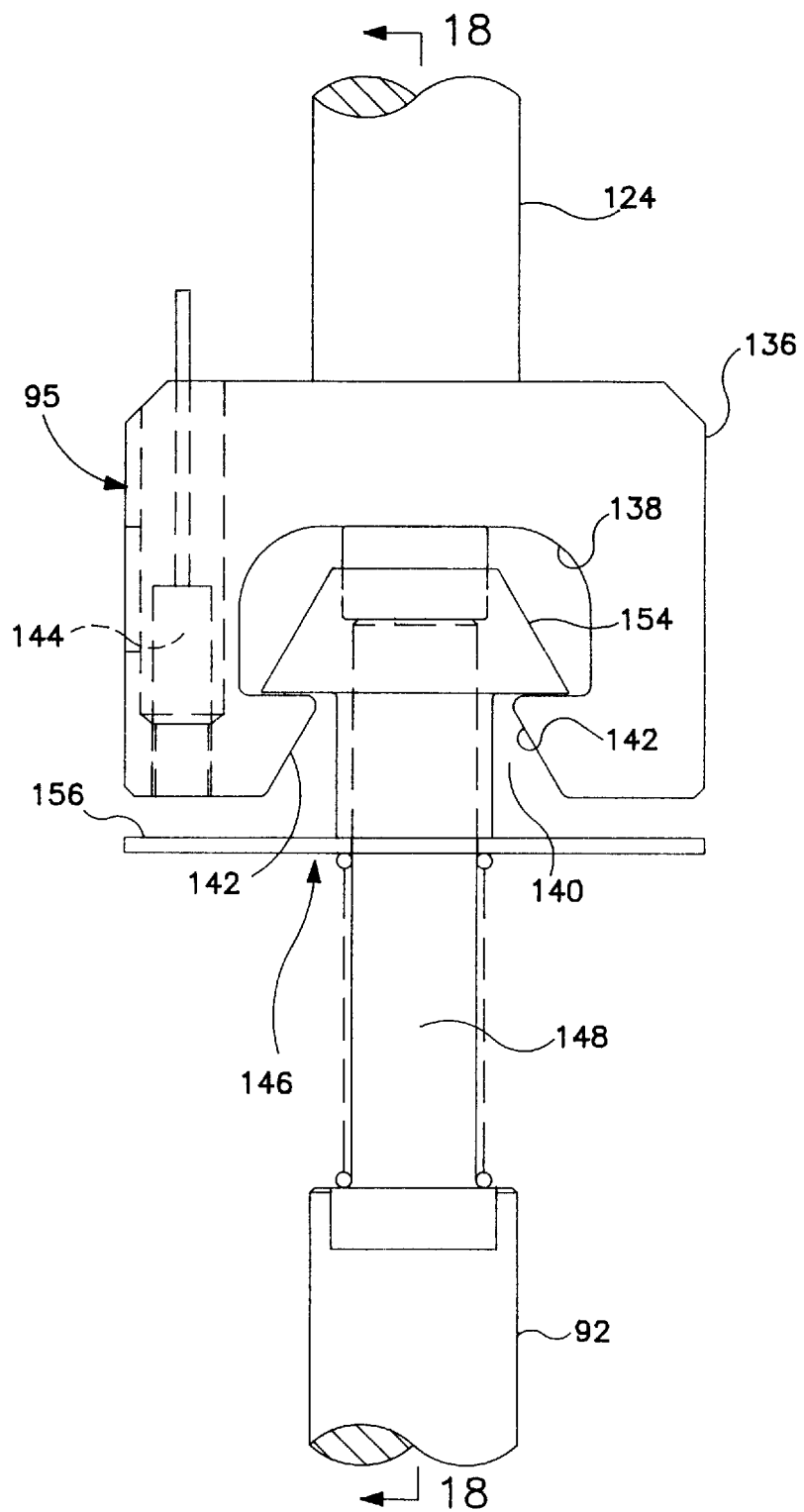
FIG. 17 is an enlarged view of portion A of FIG. 2.
Figure 18:
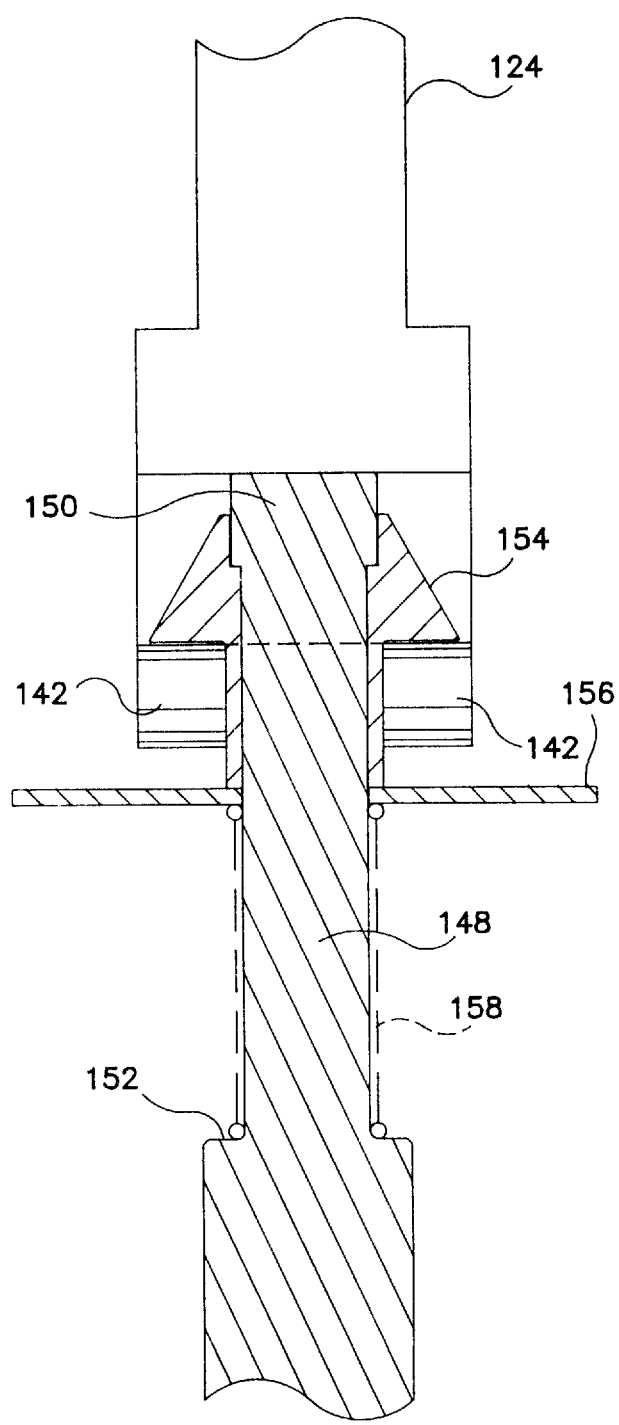
FIG. 18 a sectional view taken along line 18—18 of FIG. 17.

Rotation of each mold assembly 26 in the extended axial position 30 with an open, empty mold up from the bottom circumferential position 40 to side circumferential position 42 rotates the ends of shift rods 92 and 94 into engagement with the ends of shift shafts 124 and 126 such that longitudinal movement of the shift shafts moves the shift rods. The two disengageable connections 95 between the shift shafts and shift rods are identical and are illustrated best in FIGS. 17–19. These figures illustrate the connection 95 between shaft 124 and rod 92, it being understood that a similar connection 95 is provided between shaft 126 and rod 94.

Rectangular C-shaped receiver 136 on the end of shaft 124 defines a central recess 138 extending between opposite sides of the receiver with an opening 140 in the recess facing away from shaft 124. Opening 140 is defined by a pair of opposed and outwardly facing bevel walls 142 on the receiver. Proximity sensor 144 is mounted in the receiver to one side of opening 140 and faces away from shaft 124.

Head assembly 146 is slidably mounted on reduced diameter portion 148 of rod 92. The reduced diameter portion of the rod extends between head 150 at the end of the rod and shoulder 152. Assembly 146 includes a frusto-conical head 154 slidably mounted on portion 148 and a circular proximity plate 156 extending perpendicularly to the axis of rod 92 and spaced a distance inwardly from head 154. A spring 158 is confined on portion 148 between shoulder 152 and plate 156 to bias assembly 146 against head 150, in a position shown in FIGS. 17 and 18.

The sides of frusto-conical head 154 are at the same angle as the bevel walls 142 of receiver 136 with the head having a maximum diameter away from head 150. When the assembly 146 is held against head 150 the axial distance between the outer end of the head 150 and the major base of the head equals the width of recess 138 to permit rotation of the rod into receiver 136 to form a slack-free connection between shaft 124 and rod 92. When the shaft and rod are locked together in this position, proximity plate 156 is located a short distance outwardly from sensor 144 so that the sensor generates a signal indicating proper engagement between the rod and shaft.

Figure 19:
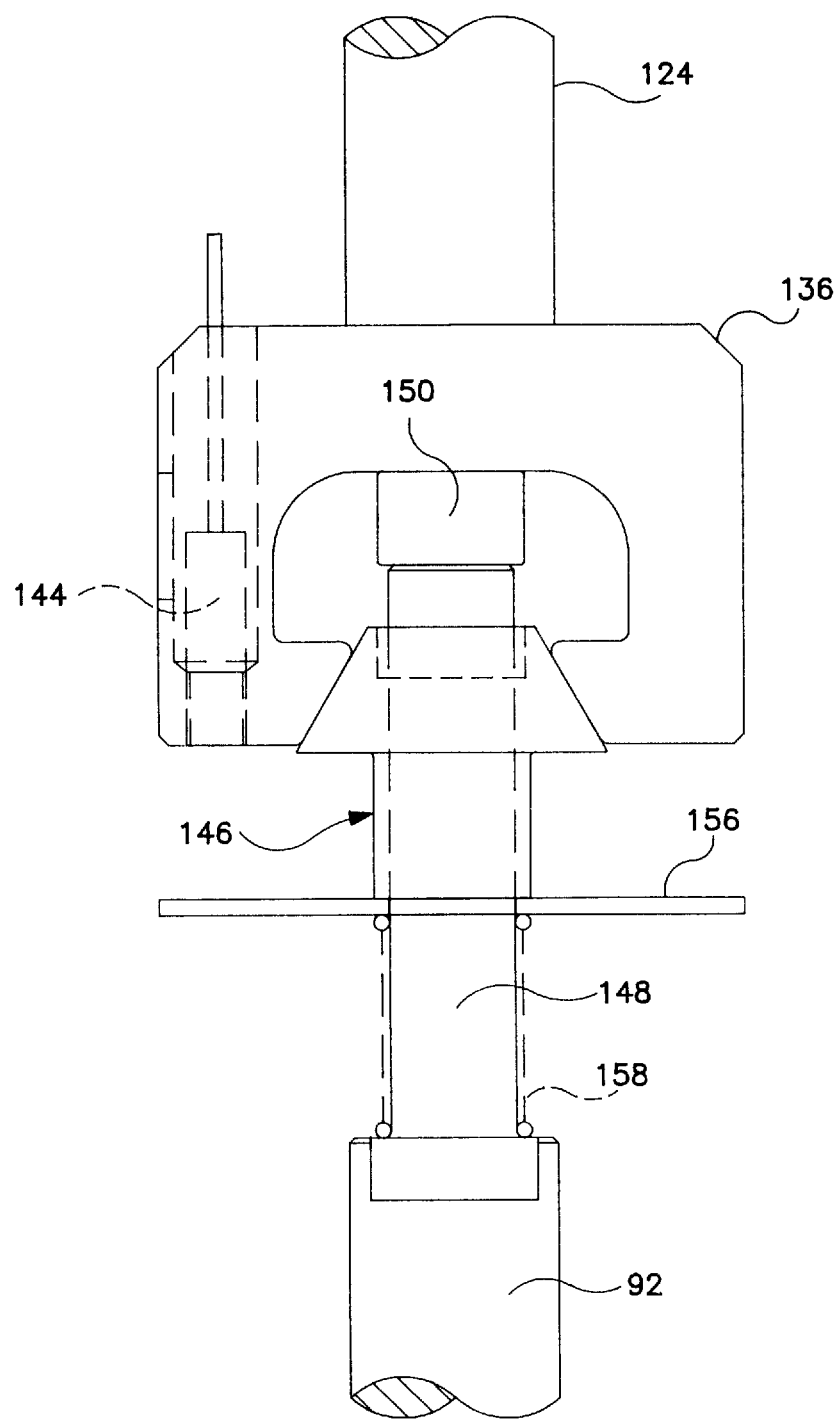
FIG. 19 is similar to FIG. 17, but illustrating a different position.

FIG. 19 illustrates a condition when the rod and shaft are not engaged properly. Rod 92 has been rotated toward receiver 136 but, because of a misalignment between the rods and shaft, the head was not moved properly into the recess 138. In this case, the conical surface of head 154 engaged the bevel walls 142 of the receiver and assembly 146 was shifted. away from head 150, compressing spring 158. Plate 156 is located an increased distance away from proximity sensor 144, which then generates a signal indicating that the shaft and rod are not properly engaged. Machine 10 is automatically shut down in response to the signal.

Figure 11:
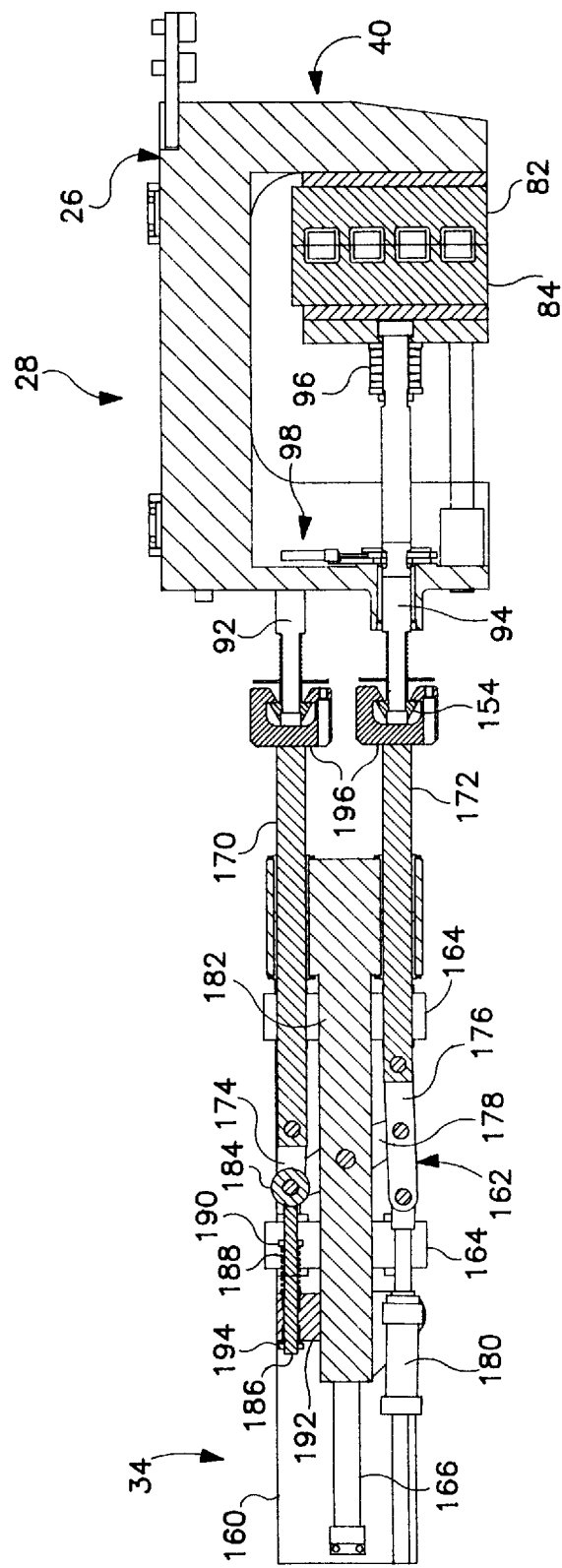
FIG. 11 is a sectional view taken generally along line 11—11 of FIG. 3.

Mold assembly drive 34 shown in FIG. 11 is mounted on support 14 to one side of bottom circumferential position 40. Drive 34 is similar to drive 32 and includes a mounting plate 160 mounted vertically on support 14 adjacent opening 38, a mold open and close drive 162 including spaced carriages 164 mounted on plate 160 by a longitudinal bearing that permits movement of the drive back and forth along the plate, and a mold shift drive 166 like drive 120. The open and close drive 162 includes shift shafts 170 and 172 like shafts 124 and 126, links 174 and 176 like links 128 and 130, toggle link 178 like toggle link 132 and hydraulic cylinder 180 having a piston rod joined to the end of link 176. Body 182 is like body 122.

The mold drive 162 includes an engagement member 184 mounted on the cross pin joining link 174 to toggle link 178. Positioning pin 186 is mounted in a block 192 on body 182 and extends toward member 184. A spring 188 surrounds pin 186 and is confined between the block and the head 190 to bias the pin toward the engagement member 184. Head 194 on the end of the pin limits extension of the pin by the spring.

Receivers 196, like receivers 136, are mounted on the ends of shafts 170 and 172 to form connections with rods 92 and 94 of a mold assembly 26 in retracted axial position 28 which is rotated to bottom circumferential position 40. When the mold assembly is rotated to position 40 the two mold halves 82 and 84 are held closed by latch assembly 98 and spring 96 is compressed. Shafts 170 and 172 are held in the position shown in FIG. 11 with engagement member 184 held against the end of extended pin 186. With the shafts in this position, the receivers 196 are properly positioned to receive the head assemblies on rods 92 and 94. After the retracted mold assembly is in bottom position 40, cylinder 160 is extended to shift the assembly to extended position 30. Cylinder 180 is then extended slightly to rotate toggle link 178, retract pin 186 a slight distance, extend shaft 172 and compress spring 96 a slight amount, thereby shifting the end of undercut 100 from engagement with plate 104 and permitting pressurized cylinder 102 to extend and shift the plate from the latched position of FIG. 13 to the unlatched position of FIG. 12. Subsequent full retraction of cylinder 180 then opens the mold halves. After assembly has been opened, containers have been ejected, and the assembly is rotated up to circumferential position 42, cylinder 180 is extended to retract and extend shafts 170 and 172, respectively. After release of pressure from the cylinder, spring 188 extends pin 186 to engage the member 184 and return shift the shafts 170 and 172 to the proper positions for receiving the next mold assembly rotated down to circumferential position 40. Cylinder 166 is retracted.

Each blow pin assembly 50 includes a mounting plate 198 secured to the side of plate 24 facing support 16 on the forward or lead side of a cutout opening 48. A pair of spaced parallel mounting blocks are secured to plate 198 with a pair of air cylinders 202 confined between the blocks. The piston rods of cylinders 202 extend freely through the block 200 adjacent the cutout opening and are joined to air pin block 204 located a short distance inwardly from opening 48. Four spaced blow pins 206 extend from block 204 toward the adjacent opening 48. A pair of guide rods 208 are journaled in bearings in the ends of blocks 200. The lower ends of the guide rods are mounted in the ends of blow pin block 204. The upper ends of the guide rods, located a distance above the upper block 200, are joined to drive cross plate 210. A pair of engagement posts 212 extend through the center portion of plate 210.

Figure 14:
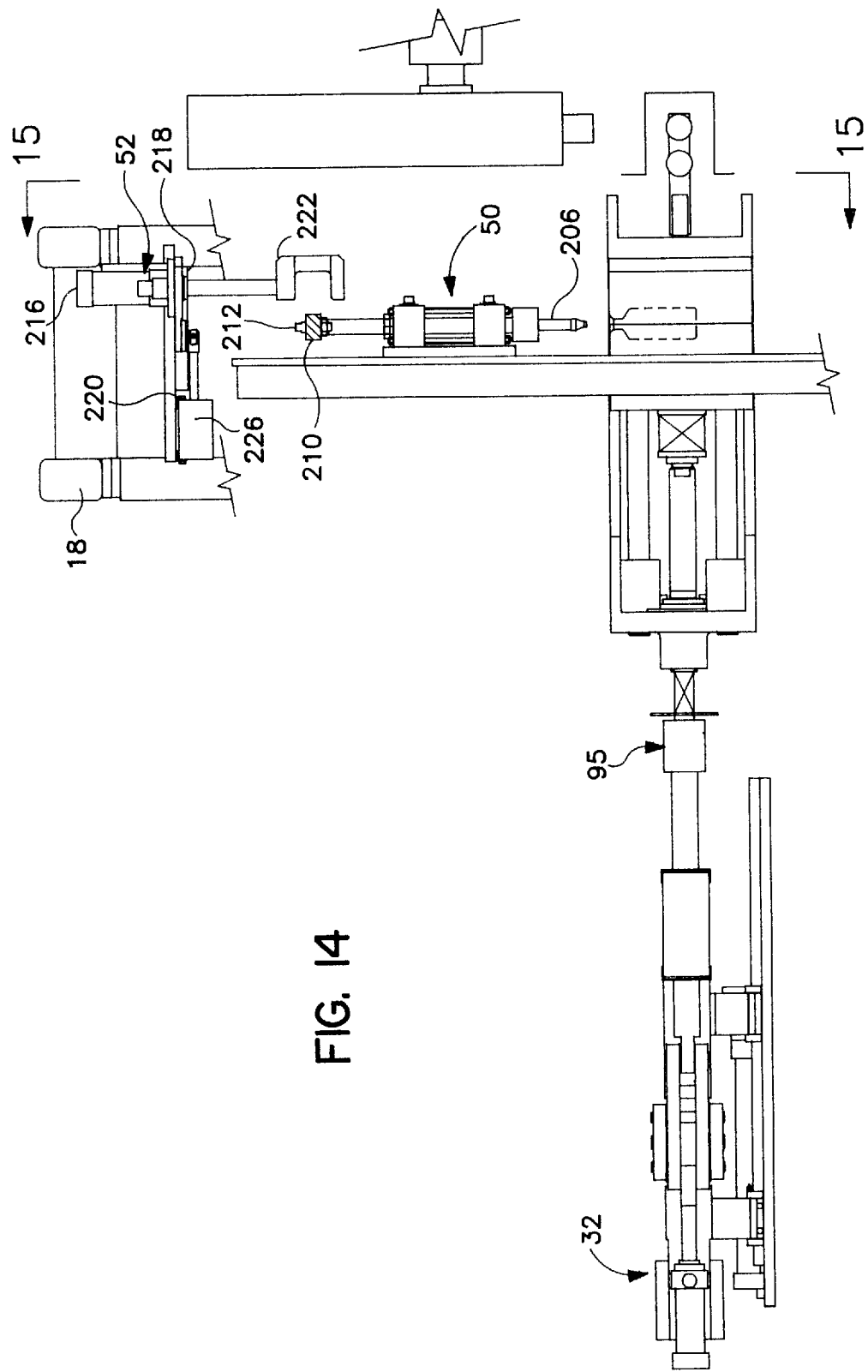
FIG. 14 is a partial side view of the machine.
Figure 16:
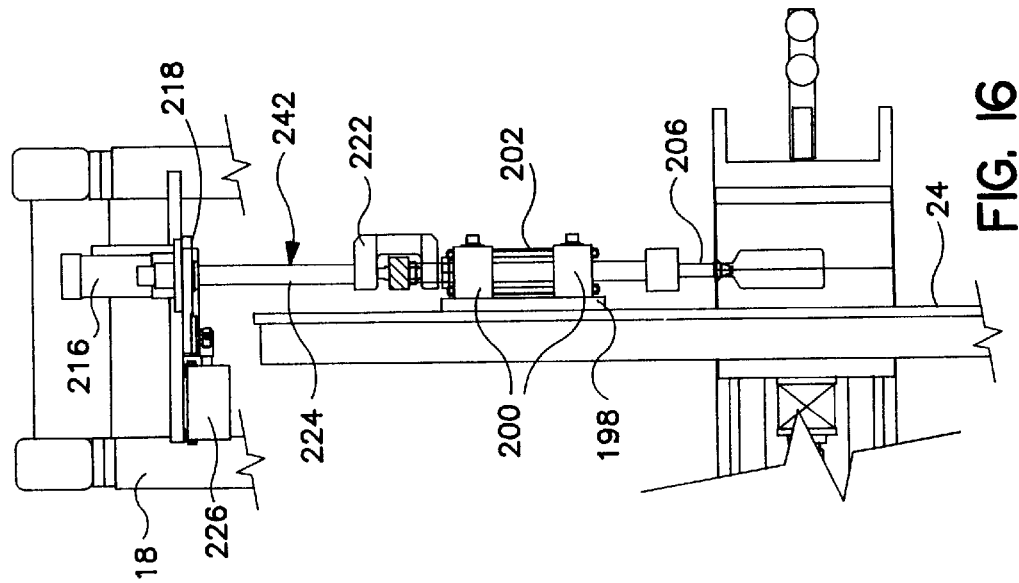
FIG. 16 is similar to FIG. 14, but illustrating a different position.
Figure 15:
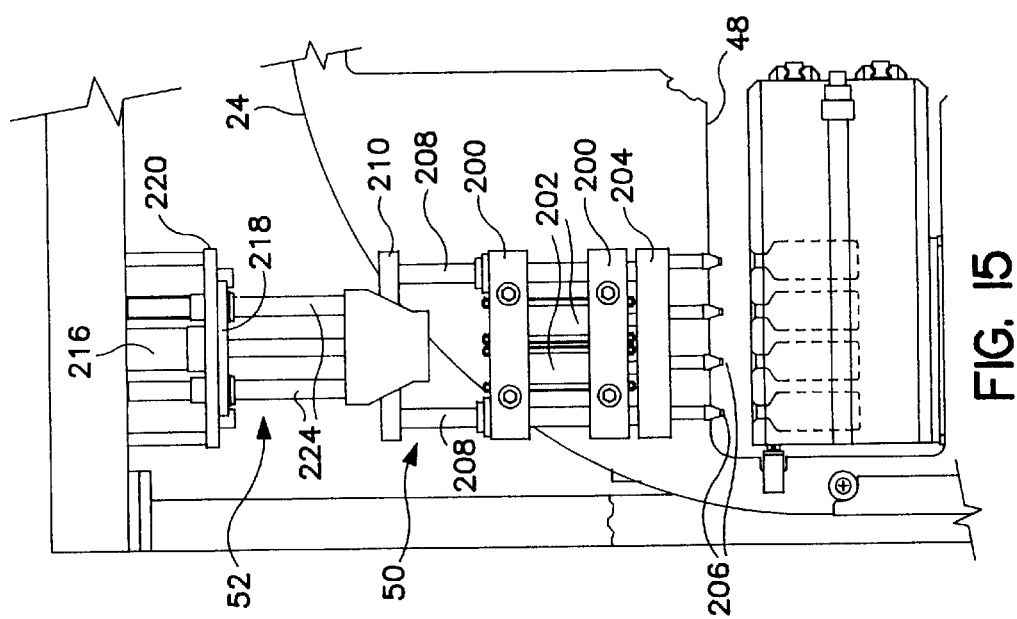
FIG. 15 is a view taken generally along line 15—15 of FIG. 14.

Blow pin seating drive 52 is mounted on the top of support 18 above the blow pin assembly 50 associated with the mold assembly 26 at circumferential side position 42. The blow pin seating drive 52 is illustrated in FIGS. 14–16 and includes a hydraulic cylinder 216 having a lower end mounted on a moveable support plate 218 held against the lower surface of fixed support plate 220. The piston rod of cylinder 216 extends downwardly through plate 218 to a U-shaped receiver 222 having an open side facing circular plate 24. Guide rods 224 are joined to receiver 222 and extend through bearings in plate 218. The hydraulic cylinder 216, plate 218, receiver 222 and rods 224 are moveable by air cylinder 226 mounted on frame 18 parallel to the axis of the main shaft 12 between the positions shown in FIGS. 14 and 16. Receiver 222 has a close fit over pins 212 of assembly 50 when the cylinder 226 is retracted.

As shown in FIG. 4, a support roller 228 is mounted on the side of plate 24 facing support 16 outside of each opening 48. An elongate anti-rotation arm 230 extends generally vertically along the left side of support 18 as shown in FIG. 4 from pivot connection 232 at the bottom of the arm to recessed support upper end 234 located radially outwardly from each mold assembly 26 in circumferential position 42. A spring 236 mounted on support 18 biases arm 230 toward the plate to position recessed stop 124 at the upper end of arm 230 under roller 228. Spring 236 is mounted on one side post of support 18 adjacent arm 230 and biases the end of the arm inwardly toward the support rollers 228. Inward rotation of the arm is limited by a pin and slot connection 238. The roller 228 and arm 230 are located a distance outwardly from plate 24 so that the arm clears blow pin assemblies 50.

Arm 230 holds plate 24 against counter rotation during insertion of blow pins into a mold. If desired, other types of anti-rotation systems may be used to hold the plate stationary during blow pin insertion. Additionally, spring 236 may be replaced by a drive member, such as a fluid cylinder, which positively rotates arm 230 into engagement with a roller to hold the plate and then retracts the arm from the roller after blow pin insertion.

As drive 22 rotates a mold assembly 26 to the circumferential position 42 the roller associated with the assembly engages the arm, cams the arm outwardly until the drive dwells with the plate positioned as shown in FIG. 4. Spring 236 holds arm 230 under the roller 228. The arm 230 supports plate 24 against counter rotation during insertion of the blow pins into the mold at circumferential station 42.

During operation of machine 10 the two mold open and close drives 116 and 162 operate as parts of a single mold drive which opens the molds at circumferential position 40 and closes the molds at circumferential position 42. Likewise, the two mold shift drives 120 and 166 operate as parts of a single drive which shifts the mold assemblies axially along the main shaft between the retracted and extended positions.

An arcuate assembly alignment plate or member 240 is mounted on the side of support 16 facing plate 24 and lies in a plane perpendicular to the axis of main shaft 12. Mold assemblies are in the axial retracted position 28 when rotated to bottom circumferential position 40. While in position 40 the assembly is axially shifted to the extended or container ejection position 30, opened and blow molded containers in the mold are ejected. The assembly with open molds in extended position 30 is then rotated up to circumferential position 42, with the open mold halves located to either side of growing parisons 58. During rotation of the extended mold assemblies from circumferential position 40 to position 42 alignment rollers 80 on the assemblies are rotated into engagement with plate 240 to assure that the mold assembly is in proper axial alignment. Proper alignment of the assembly assures that the mold halves are positioned to either side of the growing parisons and that the heads 154 on the ends of shift rods 92 and 94 are properly positioned for rotation into the receivers 136 on the ends of shift shafts 124 and 126 of mold assembly drive 32. Plate 240 is located between circumferential positions 40 and 42 to permit axial shifting of mold assemblies to the extended axial position when in the bottom circumferential position and to permit axial shifting of extended mold assemblies when in circumferential position 42 to the retracted axial position. The assemblies engage plate 240 during rotation between positions 40 and 42 only.

If desired, a second alignment plate, like plate 240, may be provided to align mold assemblies in the retracted axial position during rotation down from side circumferential position 46 to bottom circumferential position 40, assuring a proper engagement between the mold assemblies and mold assembly drive 34.

Mold halves 82 and 84 are of conventional design and include interior cooling passages (not illustrated) which are connected to a water cooling system including inlet and outlet pipes (not illustrated) located in main shaft 12.

The horizontal rotary blow molding machine is operated by an automatic controller which is responsive signals received from a number of sensors and switches on the machine. The controller is conventional and is not illustrated.

Operation of machine 10 will now be described by following one mold assembly 26 through a complete molding cycle, it being understood that the machine operates continuously and that all four mold assemblies 36 are continuously rotated through molding cycles.

Parison extruder 54 extrudes four parisons 58 down from head 56 during operation of machine 10. When cylinder 66 is extended parison extruder head 56 is located a short distance above the mold halves in a mold assembly in the parison capture position. The parison thickness is controlled by the extruder head to facilitate breakaway of parisons captured in the mold halves when the head is bobbed up away from the closed mold.

At the beginning of a cycle of operation a mold assembly 26 is in the extended bottom ejection position with shift rods 92 and 94 engaging shift shafts 170 and 172 of mold assembly drive 34. The mold latch of the assembly is disengaged and cylinder 180 of drive 34 is retracted to hold the mold halves open. The cylinder of mold shift drive 166 is extended to locate the assembly in extended axial position 30. Containers blown during a prior cycle of operation have been ejected from the mold. Drive 22 is dwelled with one mold assembly in each of the four circumferential positions. This position is illustrated in FIG. 1 of the drawings where the described mold assembly 26 is shown below main shaft 12 and adjacent support 16.

Figure 7:
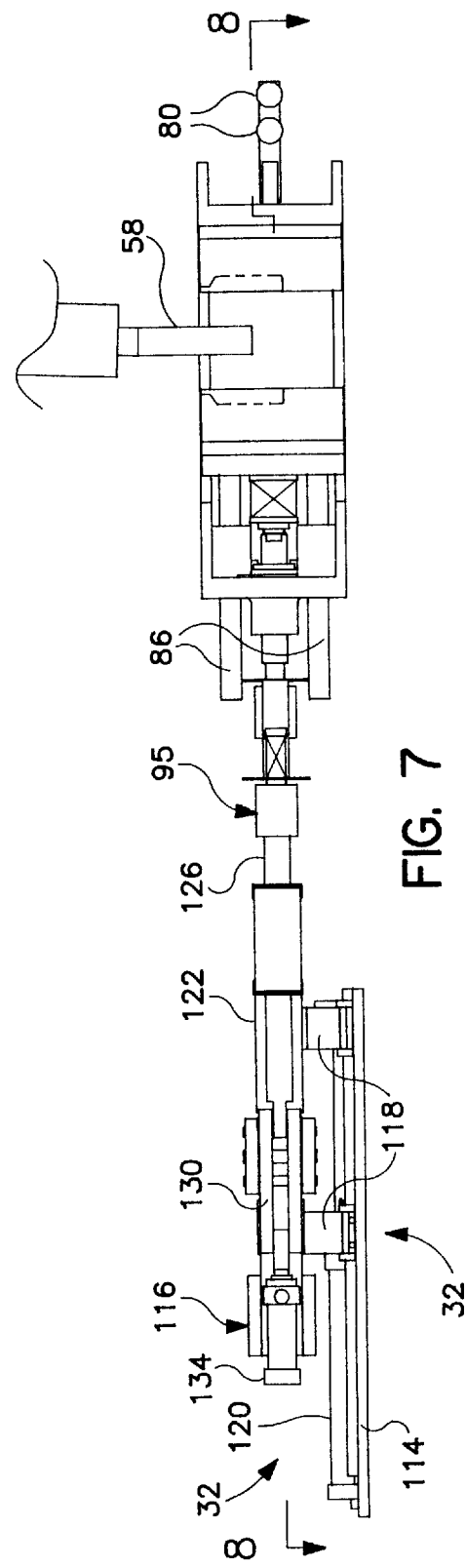
FIG. 7 is a side view taken generally along line 7—7 at FIG. 3.

Next, drive 22 is actuated to rotate the main shaft 12, plate 24 and mold assemblies 90° in the direction of arrow 20. During rotation of the extended mold assembly from bottom circumferential position 40 to side circumferential position 42 the alignment rollers 80 on the assembly engage plate 240 to assure the assembly is in proper axial position as rotated into position 42. During rotation into position 42 the open empty mold halves 82 and 84 are rotated up to either side of the downwardly growing parisons 58. The heads 154 on shift rods 92 and 94 are rotated out of the receivers 196 on shift shafts 170 and 172 of mold assembly drive 34 and into receivers 196 on shift shafts 124 and 126 of mold assembly drive 32. Cylinder 134 of drive 32 is retracted and the cylinder of mold shift drive 120 is extended so that the receivers are in proper position and heads 154 are rotated into recesses 138 to engage the receivers as the mold assembly is rotated into circumferential position 42. The position of the mold assembly 26 and drive 32 is illustrated in FIGS. 7 and 8.

Next, cylinder 68 of parison extruder 54 is retracted to lower the extrusion head 56 and position the parisons in proper locations between the mold halves 82 and 84 with head 56 a short distance above the top of the mold halves. Cylinder 134 of drive 32 is then extended to simultaneously retract shift shaft 124 and extend shift shaft 126 and close the mold halves 82 and 84 on the parisons 58. During closing spring 96 is compressed and the shoulder on undercut 100 on shift rod 94 moves beyond the inner face of latch plate 104 permitting the pressurized cylinder 102 of latch assembly 98 to retract and shift the plate 104 from the unlatched position of FIG. 12 to the latched position of FIG. 13.

Figure 9:
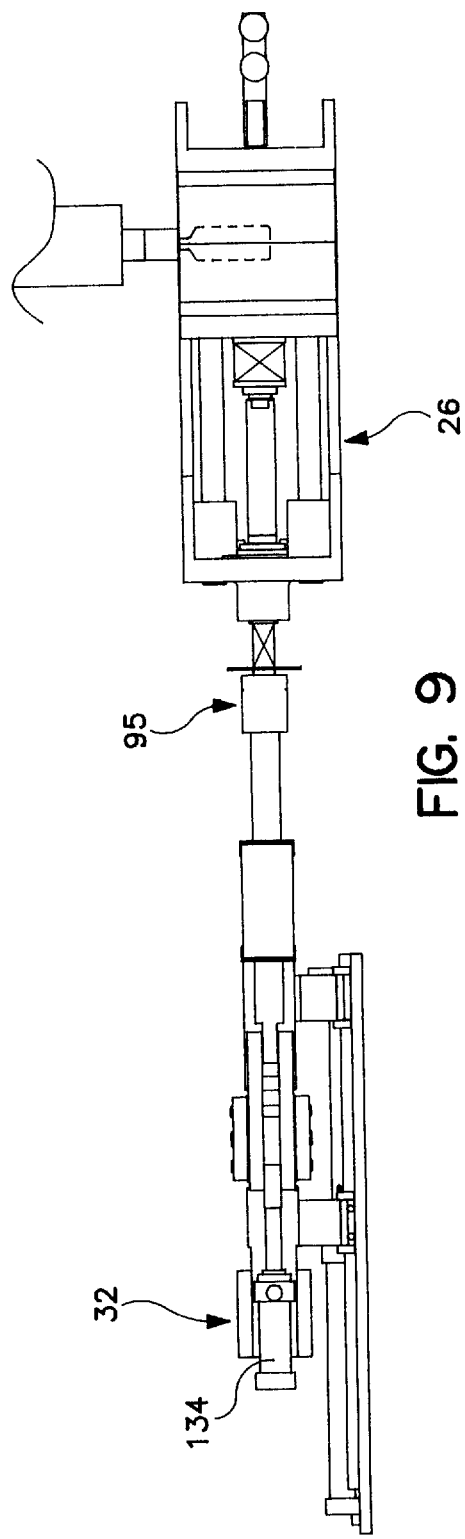
FIGS. 9 and 10 are similar to FIGS. 7 and 8, but illustrating a different position.
Figure 10:
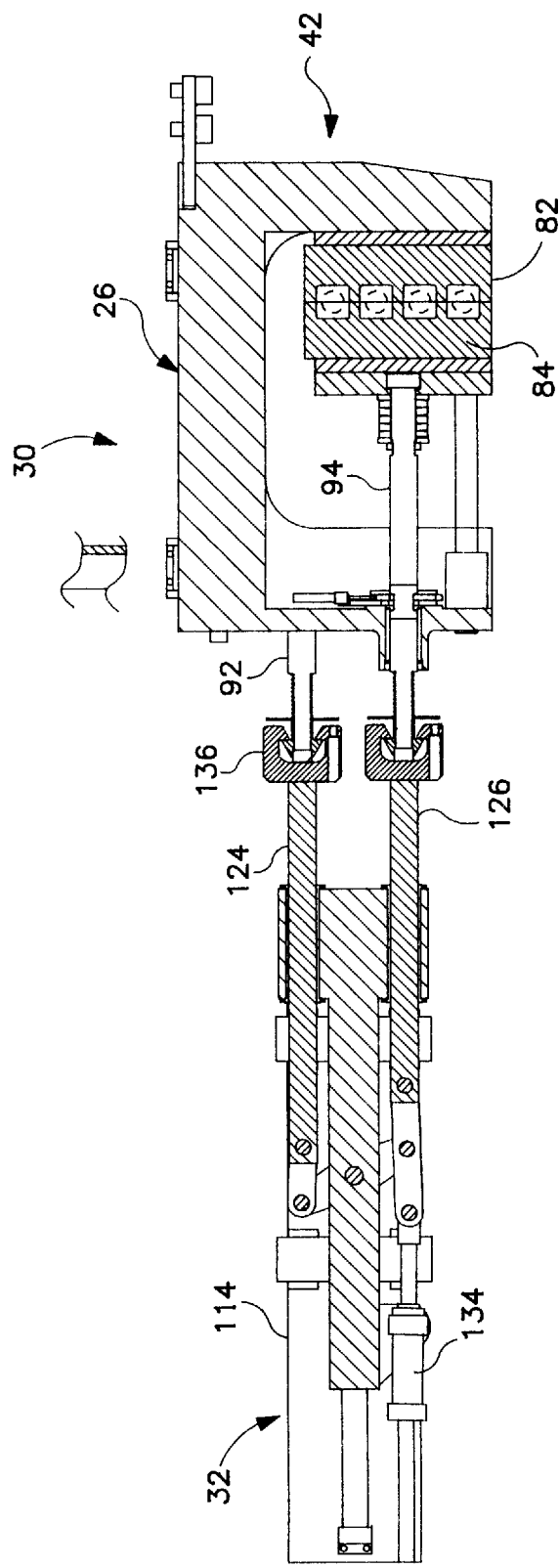

Upon closing of the mold and capture of the parisons, cylinder 66 in the parison extruder is extended to bob extrusion head 56 up and break the captured parison portions from the continuing growing new parisons. The extrusion head is bobbed up a sufficient distance to assure that the newly growing parisons do not touch the mold assembly during axial shifting to the retracted position. The position of the mold assembly and drive 32 with closed molds and captured parisons is illustrated in FIGS. 9 and 10.

Once the parisons have been captured and the extrusion head has been raised, the hydraulic cylinder of mold shift drive 120 is retracted to shift the mold assembly at circumferential position 42 axially from extended axial position 30 to retracted axial or blow position 38 underneath blow pin assembly 50. Head 56 is then lowered.

During rotation of the mold assembly to position 42 cylinder 226 of blow pin seating drive 52 is extended and receiver 222 is located to one side of cross plate 210 and pins 212, as illustrated in FIG. 14. After rotation, cylinder 226 is then retracted to shift receiver 222 over pins 212 and form a connection between the seating drive 242 and the adjacent blow pin assembly 50.

Upon shifting of the closed mold assembly to the retracted axial or blow position 28 the necks of the mold cavities are axially aligned with the blow pins. Hydraulic cylinder 216 and air cylinders 202 are then extended to drive the blow pins axially down into the open parisons confined in necks of the cavities in the top of the mold. Axial lowering of the blow pins accurately calibrates or shapes the plastic at the neck to form the necks of the blow molded containers. After insertion of the blow pins, blow air is flowed through the pins into the interiors of the captured parisons to blow the parisons against the walls of the mold cavities. After blowing, pressure is maintained on cylinders 202 to hold the blow pins in place, pressure on cylinder 206 is released and cylinder 226 is reextended to shift receiver 222 out of engagement with the blow pin assembly 50.

During blow molding the mold halves are held closed by cylinder 134 of open and close drive 116 at a high clamp force of approximately 7 tons. After molding and before rotary indexing of the mold assembly away from position 42 the pressure supplied to cylinder 134 is released to allow spring 96 to expand slightly and seat the side edge of undercut 100 against the closed latch plate 104 so that the spring maintains a reduced clamp force of about 5 tons during cooling of the blown parisons. After reduction of the clamp force, the drive 22 indexes shaft 12 and the mold assembly is rotated to move heads 154 out of receivers 136.

After retracted mold assembly 26 has been rotated from circumferential position 42 cylinder 120 is extended and cylinder 134 is fully retracted to place drive 32 in the position shown in FIG. 8 ready to receive the next open mold assembly 26 rotated up to position 42.

Pressurized air cylinders 202 hold the blow pins 206 in the mold as the retracted mold assembly is rotated from circumferential position 42 to top cooling position 44, side cooling position 46 and back to bottom position 40. During this time the blown parisons in the mold cavities cool and set to form containers having shapes defined by the mold cavities.

Immediately prior to rotation of the mold assembly to bottom circumferential position 40 the blow pressure is reduced and blow pin assembly air cylinders 202 are retracted to withdraw blow pins 206 from the closed mold and free the assembly for shifting to the extended container ejection position.

After the retracted closed and latched mold assembly has been rotated down to bottom circumferential position 40 and rods 92 and 94 have engaged the receivers 136 of retracted drive 34, as illustrated in FIG. 11, rotary drive 22 dwells rotation of the mold assembly and cylinder 166 is extended to shift the mold assembly from retracted position 28 to extended position 30. Cylinder 180 is then extended to compress spring 96 to increase the clamping force and relieve pressure from the latch assembly 98. At this time, latch assembly cylinder 102 is pressurized so that upon extension of cylinder 180 and release of plate 104 cylinder 102 extends to shift the freed plate 104 from the latched position of FIG. 13 to the unlatched position of FIG. 12.

Upon unlatching of the mold, cylinder 180 is retracted to open mold halves 82 and 84 so that the containers molded in the mold cavities are ejected from recesses 90 by eject pins (not illustrated). Bottle ejection equipment then removes the molded containers from machine 10. The containers are ejected downwardly from the bottom circumferential ejection position 40 with the benefit of gravity, thereby reducing the risk that molded containers hang up in the machine or that flash or debris collects in the machine. When in the container eject position, the molds are below the main shaft so that flash and debris fall out from the machine. After the assembly has been rotated up from circumferential position 40 to circumferential position 42 cylinder 166 is retracted, cylinder 180 is extended and then relieved of pressure to allow pin 186 to shift the receivers 196 of drive 34 in position for receive the heads 154 of the next retracted mold assembly. Return of the assembly 26 to the extended axial position 28 and bottom circumferential position 40 and ejection of the containers completes a full cycle for the assembly.

Main shaft drive rotates the molds 90° in approximately 1 second and is then dwelled for approximately 1.5 seconds prior to the next rotation. Operation of the drive, with dwelling, completely rotates the molds 360° around the axis of the main shaft in 10 seconds with a total production of 16 molded containers. The machine produces 96 containers per minute.

The invention has been described using blow molds which blow captured parisons by axial insertion of blow pins into the cavity necks. If desired, the invention may be used with molds which blow the captured parisons using blow needles. Also, it is not necessary that the molded containers be ejected at the bottom position of the molding machine. Containers may be ejected at any position, although, as mentioned above, it is desirable to eject containers from an opened mold below the main shaft. The invention has been described in connection with a rotary blow molding machine with four molds where the main shaft is rotated at 90° steps. The invention is not limited to a blow molding machine with four molds. The number of molds in the machine may be more than or less than four.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as my invention is:

1. A horizontal rotary blow molding machine including a pair of spaced apart main shaft supports; a horizontal rotary main shaft journaled in bearings in said supports; a plurality of mold assemblies spaced around the main shaft between the supports, each assembly including a frame having a base adjacent to the main shaft and a pair of spaced apart arms extending outwardly from the main shaft, a blow mold comprising a pair of mold halves mounted in the frame between said arms for relative movement in a direction parallel to the axis of the main shaft between an open mold position and a closed mold position, a shift rod joined to one mold half and extending parallel to the axis of the main shaft past an adjacent arm, and a mold clamp engageable with the shift rod; a plurality of linear bearings, each bearing joining a mold assembly to the main shaft whereby the mold assemblies are moveable along the main shaft; a mounting member on the main shaft; a plurality of blow pin assemblies on the mounting member, each assembly associated with one of said molds and including a blow pin engageable with such mold and a blow pin drive operable to move the blow pin toward and away from the mold; a rotary drive engageable with said main shaft and operable to rotate the main shaft, mold assemblies, mounting member and blow pin assemblies around the horizontal axis of the main shaft in steps and to dwell the main shaft, mold assemblies, mounting member and blow pin assemblies in circumferential positions between rotary steps, said positions including a container eject position and an adjacent parison capture position located above the container eject position; a first mold assembly drive mounted on one ,of said supports adjacent the container eject position and a second mold assembly drive mounted on one of said supports adjacent the parison capture position; engageable and disengageable members forming drive connections between said respective mold assembly drives and mold assemblies located in the container eject position and the parison capture position, said first mold assembly drive operable to shift a mold assembly along the main shaft from a retracted position to an extended position and to open the mold in such assembly, said second mold assembly drive operable to shift a mold assembly along the main shaft from an extended position to a retracted position and to close the mold in such assembly; and a parison extruder located above a mold assembly located in the circumferential parison capture position and in the extended position on the main shaft.

2. A rotary blow molding machine as in claim 1 including a parison drive for bobbing the parison extruder.

3. A rotary blow molding machine as in claim 1 wherein said mounting member comprises a plate, said plate having a cutout opening for each mold assembly.

4. A rotary blow molding machine as in claim 1 including an anti-rotational member engageable with a rotational part for holding the mold in place during blow pin insertion.

5. A rotary blow molding machine as in claim 1 wherein said first and second mold assembly drives are mounted on the support located adjacent the retracted axial position of the mold assemblies on the main shaft.

6. A rotary blow molding machine as in claim 1 wherein said drive connections include connections between A) each mold assembly drive and B) each mold assembly frame and each shift rod.

7. A rotary blow molding machine as in claim 1 including a fixed alignment member engageable with a mold assembly during rotation to align the member axially with respect to the main shaft.

8. A rotary blow molding machine as in claim 1 including a plurality of springs, each spring located between a shift rod and one mold half.

9. A rotary blow molding machine including,
   a. an elongate main shaft defining a rotary axis extending along the length of the shaft;
   b. a plurality of mold assemblies spaced around the main shaft, each assembly including a blow mold having mold halves moveable parallel to the rotary axis between opened and closed mold positions;
   c. a plurality of linear bearings, each linear bearing extending longitudinally along the main shaft and connecting a mold assembly to the main shaft for movement along the shaft;
   d. a first drive operable to shift a mold assembly along the main shaft between spaced positions on the main shaft;
   e. a second drive operable to open and close the mold halves of a mold assembly; and
   f. a shaft drive connected to the main shaft and operable to rotate the main shaft and mold assemblies around the rotary axis.

10. A rotary blow molding machine as in claim 9 wherein the axis of said main shaft extends horizontally.

11. A rotary blow molding machine as in claim 10 wherein said shaft drive rotates the main shaft and mold assemblies in steps around the shaft axis and dwells the shaft and mold assemblies between steps with mold assemblies located at circumferential positions, said circumferential positions including a lower container eject position and an extrusion capture position located above the eject position.

12. A rotary blow molding machine as in claim 11 including a parison extruder located above a mold located in the circumferential extrusion capture position.

13. A rotary blow molding machine as in claim 12 including a blow assembly located at the extrusion capture position and spaced along the axis of the main shaft a distance from the extruder.

14. A rotary blow molding machine as in claim 13 wherein said blow assembly includes a blow pin and including a pin drive operable to extend the blow pin into a mold.

15. A rotary blow molding machine as in claim 12 including a blow assembly associated with each mold, such assemblies mounted on and rotatable with the main shaft.

16. A rotary blow molding machine as in claim 15 including a blow pin seating drive.

17. A rotary blow molding machine as in claim 16 wherein the blow pin seating drive is mounted on a nonmoveable support adjacent the extrusion capture position.

18. A rotary blow molding machine as in claim 12 wherein said extrusion capture position is one step from the container eject position.

19. A rotary blow molding machine as in claim 9 comprising a plurality of blow assemblies mounted on and rotatable with the main shaft, each blow assembly associated with a mold assembly and including a parison blow member engageable with the mold in such assembly.

20. A rotary blow molding machine as in claim 19 including a rotatable support mounted on the main shaft, said blow assemblies mounted on said support and each including a blow member drive for extending a blow member into the associated mold.

21. A rotary blow molding machine as in claim 20 wherein said blow members comprise blow pins.

22. A rotary blow molding machine as in claim 21 including a fixed support adjacent the rotatable support, and a blow pin seating drive on the fixed support engageable with said blow assemblies.

23. A rotary blow molding machine as in claim 22 including an anti-rotation member engageable with a rotatable portion of the machine during seating of a blow pin.

24. A rotary blow molding machine as in claim 9 wherein said first and second drives are mounted on fixed supports at locations adjacent said mold assemblies and including engageable and disengageable drive connections between said first and second drives and said mold assemblies.

25. A rotary blow molding machine as in claim 24 wherein said first drive includes a first axial shift unit adjacent the container eject position and a second axial shift unit adjacent the parison capture position.

26. A rotary blow molding machine as in claim 24 wherein said second drive includes a mold opening unit adjacent the container eject position and a mold closing unit adjacent the parison capture position.

27. A rotary blow molding machine as in claim 24 wherein each engageable and disengageable drive connection includes a receiver having a recess and a head engageable within said recess.

28. A rotary blow molding machine as in claim 9 wherein each mold assembly includes a mold clamp.

29. A rotary blow molding machine as in claim 28 wherein each mold assembly includes a shift member connected to one mold half through a spring, said mold clamp engageable with said shift member.

30. A rotary blow molding machine as in claim 9 including a fixed first alignment member and wherein each mold assembly includes an assembly alignment member engageable with said fixed alignment member during rotation of the mold assembly.

31. A rotary blow molding machine as in claim 9 wherein each mold assembly includes a base mounted on the main shaft by a linear bearing and a pair of spaced-apart arms extending from the base away from the main shaft, said arms supporting a mold.

32. A rotary blow molding machine including a main shaft having a longitudinal axis; a plurality of blow molds mounted on and spaced around the main shaft; a mold shift drive operable to shift the molds along the main shaft between extended and retracted axial positions, a mold opening and closing drive operable to open and close the molds; and a shaft drive operable to rotate the main shaft and molds around the longitudinal axis.

33. A rotary blow molding machine as in claim 32 including a fixed support, said mold shift drive and said mold opening and closing drive mounted on said support, and engageable and disengageable connections joining said molds to such drives.

34. A rotary blow molding machine as in claim 32 wherein said axis is horizontal.

35. A rotary blow molding machine as in claim 32 including linear bearings mounting the blow molds to the main shaft and wherein said mold shift drive shifts the molds axially along the main shaft.

36. A rotary blow molding machine as in claim 32 wherein said main shaft extends horizontally and said shaft drive rotates the main shaft and molds around the axis in steps and dwells the shaft and molds at circumferential positions between steps.

37. A rotary blow molding machine as in claim 36 wherein said positions include a container eject position and a parison capture position located above the container eject position.

38. A rotary blow molding machine as in claim 37 including a parison extruder adjacent the parison capture position and a blow assembly adjacent the parison capture position.

39. A rotary blow molding machine as in claim 38 wherein said extruder and said blow assembly are spaced apart along the main shaft.

40. A rotary blow molding machine as in claim 39 including engageable and disengageable connections between the molds and the mold shift drive.

41. A rotary blow molding machine as in claim 40 including engageable and disengageable connections between. the molds and the mold opening and closing drives.

42. A rotary blow molding machine as in claim 32 including a mold clamp associated with each mold.

43. A rotary blow molding machine as in claim 32 including a blow assembly associated with each mold, said assemblies mounted on the main shaft and rotatable with the main shaft and molds.

44. A rotary blow molding machine as in claim 43 wherein each assembly includes a blow pin and a pin drive.

45. A rotary blow molding machine as in claim 44 including a blow pin seating drive.

46. A blow molding machine comprising,
   a. a blow mold assembly including a mold carriage, a blow mold including a pair of mold halves mounted in said mold carriage for relative movement between an open mold position and a closed mold position, a mold shift mechanism to move said blow mold halves between the open and closed mold positions, and said mold shift mechanism including a shift actuator;
   b. an assembly drive operable to move said blow mold assembly along a path between a first position and a second position;
   c. a mold closing device located adjacent the first position, said mold closing device including a first coupling element located to engage said shift actuator and form a first operable connection between said mold closing device and said blow mold when said blow mold assembly is in the first position and to disengage from said shift actuator and break said first operable connection between said mold closing device and said blow mold when said blow mold assembly is away from the first position; and
   d. a mold opening device located adjacent the second position, said mold opening device including a second coupling element located to engage said shift actuator and form a second operable connection between said mold opening device and said blow mold when said blow mold assembly is in the second position and to disengage from said shift actuator and break said second operable connection between said mold opening device and said blow mold when said blow mold assembly is away from the second position.

47. A blow molding machine as in claim 46 wherein said blow mold assembly includes a mold latch to maintain said blow mold halves in the closed position when said blow mold assembly is moved from the first position to the second position.

48. A blow molding machine as in claim 47 wherein said mold shift mechanism includes a spring located between said mold latch and a blow mold half.

49. A blow molding machine as in claim 46 wherein said assembly drive dwells said blow mold assembly at each of the first and second positions.

50. A blow molding machine as in claim 46 wherein said shift element includes one of a receiver and a head; each of said first coupling element and said second coupling element includes the other of a receiver and a head; each receiver includes a recess; and each head is engageable within a receiver.

51. A blow molding machine as in claim 46 wherein said assembly drive is operable to move said blow mold assembly around a closed path; said mold carriage is mounted on said blow molding machine for movement transverse to the path between extended and retracted positions; one of said mold halves is fixedly mounted on said mold carriage; and said shift actuator includes a first shift member attached to and movable with said mold carriage and a second shift member attached to and movable with the other of said mold halves.

52. A blow molding machine as in claim 51 wherein, e. said first shift member is movable along a first axis;

f. said second shift member is movable along a second axis parallel to the first axis;

g. said first coupling element includes a first coupling member movable along a third axis aligned with the first axis when said blow mold assembly is in the first position, a second coupling member movable along a fourth axis parallel to the third axis and aligned with the second axis when said blow mold assembly is in the first position, and a first toggle link connected to each of said first and second coupling members whereby actuation of said first toggle link moves said first and second coupling members in opposite directions;

h. said second coupling element includes a third coupling member axially movable along a fifth axis aligned with the first axis when said blow mold assembly is in the second position, a fourth coupling member movable along a sixth axis parallel to the fifth axis and aligned with the second axis when said blow mold assembly is in the second position, and a second toggle link connected to each of said third and fourth coupling members whereby actuation of said second toggle link moves said third and fourth coupling members in opposite directions.

53. A blow molding machine as in claim 46 including a parison extruder located adjacent the first position, a first mold carriage drive located adjacent the first position operable to move said mold carriage from an extended position to a retracted position, and a second mold carriage drive located adjacent the second position operable to move said mold carriage from the retracted position to the extended position.

54. A blow molding machine as in claim 53 wherein said assembly drive includes a horizontal rotary main shaft; and said blow mold assembly is spaced from said main shaft to rotate about said main shaft along the path.

55. A blow mold assembly for use in a blow molding machine having an assembly drive to move the blow mold assembly along a path between a first position and a second position, a mold closing device located adjacent the first position and a mold opening device located adjacent the second position, said blow mold assembly comprising, a. a mold carriage, a blow mold including a pair of mold halves mounted in said mold carriage for relative movement between an open mold position and a closed mold position, a mold shift apparatus attached to said blow mold being operable to move said blow mold halves between the open and closed blow mold positions, said mold shift apparatus including a shift actuator;

b. said mold shift apparatus being located to form a first operable connection between said blow mold and the mold closing device when said blow mold assembly is in the first position and to break said first operable connection when said blow mold assembly is away from the first position; and c. said mold shift apparatus being located to form a second operable connection between said blow mold and the mold closing device when said blow mold assembly is in the second position and to break said second operable connection when said blow mold assembly is away from the second position.

56. A blow mold assembly according to claim 55 wherein said blow mold assembly includes a mold latch to lock said blow mold halves in the closed position when said blow mold assembly is moved from the first position to the second position.

57. A blow mold assembly as in claim 56 wherein said mold shift apparatus includes a spring located between said mold latch and a mold half.

58. A blow mold assembly as in claim 55, wherein said mold carriage is to be mounted on the blow molding machine for movement transverse to the path between extended and retracted positions, and said mold closing device and said mold opening device each includes one of a receiver and a head, wherein one of said mold halves is mounted on said mold carriage; said shift actuator includes a first member attached to said mold carriage to be movable with said mold carriage and a second member attached to and movable with the other of said mold halves, each of said first and second members includes one of a receiver and a head, and each head is engageable within a receiver.

59. A blow mold assembly as in claim 58 wherein said mold carriage includes a base and a pair of spaced apart arms extending from said base; and said one of said mold halves is mounted on one of said arms.

60. A blow mold assembly as in claim 58, wherein said blow mold assembly includes a mold latch to maintain said blow mold halves in the closed position when said blow mold assembly is moved from the first position to the second position, and a spring located between said second shift member and said one of said mold halves; said second shift member includes an undercut portion located adjacent said mold latch when said mold halves are in the closed position; and said mold latch includes a latch member movable to engage and disengage said undercut portion.

61. A rotary blow molding machine comprising:

a. an elongate main shaft defining a rotary axis extending along the shaft;

b. a plurality of mold assemblies spaced around the main shaft, each assembly mounted on said shaft for relative movement between longitudinally spaced positions on the main shaft and including a blow mold having mold halves moveable between an opened mold position and a closed mold position;

c. a first drive to shift a mold assembly between the spaced positions;

d. a second drive to open and close the mold halves of the assembly; and e. a shaft drive connected to the main shaft to rotate the main shaft and mold assemblies around the rotary axis.

62. A rotary blow molding machine as in claim 61 wherein said mold halves of each mold assembly are moveable parallel to the rotary axis between the opened and closed positions.

63. A rotary blow molding machine as in claim 61 including a plurality of elongate bearings on the main shaft, each bearing connecting a mold assembly to the main shaft for movement along the shaft.

64. A rotary blow molding machine as in claim 63 wherein said bearings are linear.

* * * * *